(12) United States Patent
Briggs

(10) Patent No.: US 7,207,614 B2
(45) Date of Patent: Apr. 24, 2007

(54) CONVERTIBLE CAP/COVER ASSEMBLY FOR A PICK-UP TRUCK

(76) Inventor: Cedric Herbert Briggs, 11 Cousens Road, Bolton-Quest, Quebec (CA) J0E 2T0

(*) Notice: Subject to any disclaimer, the term of this patent is extended or adjusted under 35 U.S.C. 154(b) by 0 days.

(21) Appl. No.: 11/005,326

(22) Filed: Dec. 7, 2004

(65) Prior Publication Data

US 2006/0119124 A1   Jun. 8, 2006

(51) Int. Cl.
*B60P 3/34*   (2006.01)
(52) U.S. Cl. ................................................ 296/26.06
(58) Field of Classification Search ............ 296/26.06, 296/26.07, 26.04, 156, 173, 181.7
See application file for complete search history.

(56) References Cited

U.S. PATENT DOCUMENTS

| | | | |
|---|---|---|---|
| 3,231,305 A | | 1/1966 | Beckman |
| 3,356,410 A | | 12/1967 | Taylor |
| 3,367,708 A | * | 2/1968 | Brown et al. ............... 296/173 |
| 3,447,830 A | | 6/1969 | Willison |
| 3,458,232 A | | 7/1969 | Frank |
| 3,675,885 A | | 7/1972 | Shute |
| 4,448,453 A | * | 5/1984 | Irelan et al. ............... 296/156 |
| 4,566,729 A | | 1/1986 | Magnino |
| 4,768,824 A | | 9/1988 | Andonian |
| 4,789,196 A | | 12/1988 | Fields |
| 4,848,830 A | | 7/1989 | Parson |
| 4,964,669 A | | 10/1990 | Geier |
| 5,002,329 A | * | 3/1991 | Rafi-Zadeh ............ 296/100.08 |
| 5,016,935 A | | 5/1991 | Semple |
| 5,078,441 A | * | 1/1992 | Borskey .................. 296/26.07 |
| 5,135,278 A | * | 8/1992 | Kauffman et al. .......... 296/170 |
| 5,316,357 A | | 5/1994 | Schroeder |
| 5,366,266 A | * | 11/1994 | Harbison ............... 296/100.02 |
| 5,505,515 A | * | 4/1996 | Turner .................... 296/173 |
| 6,086,134 A | * | 7/2000 | Cravens et al. ......... 296/100.06 |
| 6,126,220 A | * | 10/2000 | Brasher .................. 296/26.04 |
| 6,152,517 A | * | 11/2000 | Steadman ............... 296/107.01 |
| 6,435,594 B1 | | 8/2002 | Ekonen et al. |
| 6,666,490 B1 | * | 12/2003 | Thacker .................. 296/26.07 |
| 6,712,421 B1 | * | 3/2004 | Wilson .................... 296/165 |
| 6,840,569 B1 | * | 1/2005 | Leigh .................... 296/173 |

OTHER PUBLICATIONS

Cargo Cover by Century, Century Truck Caps; 1 page.
Fold-A-Cover, Flexibility and Convenience Have a Great New Look, Division of Steffens Enterprises, Inc.; 2 pages.
Bed Protection, Slim Top, Urban Industries, Inc.; 2 pages.
Premium Molded Fiberglass Truck Caps, Century Truck Caps; 8 pages.
An Aluminum Utility Cap Built for Work, Century Truck Caps; 2 pages.
Hi-Profile Sleeper, Century Truck Caps; 1 page.

* cited by examiner

*Primary Examiner*—H Gutman
(74) *Attorney, Agent, or Firm*—Nancy E. Hill; Hill & Schumacher

(57) ABSTRACT

A cap and cover assembly is for use with a pick up truck having a truck box. The cap and cover assembly includes a top panel and opposing sides. Each side has a flexible side portion hingeably attached to a rigid side portion. The flexible side portion has one side attached to the top panel. The opposing sides are releasably attached to the truck box. The opposing sides have a cap configuration where the sides are in a stowed portion and a cover configuration when the sides are generally upright. In one embodiment the cap and cover assembly also includes a spring loaded lift arm adapted to aid in the cover to cap conversion. In another embodiment the sides are arranged such that in the stowed position the sides create a "keystone" arrangement.

25 Claims, 27 Drawing Sheets

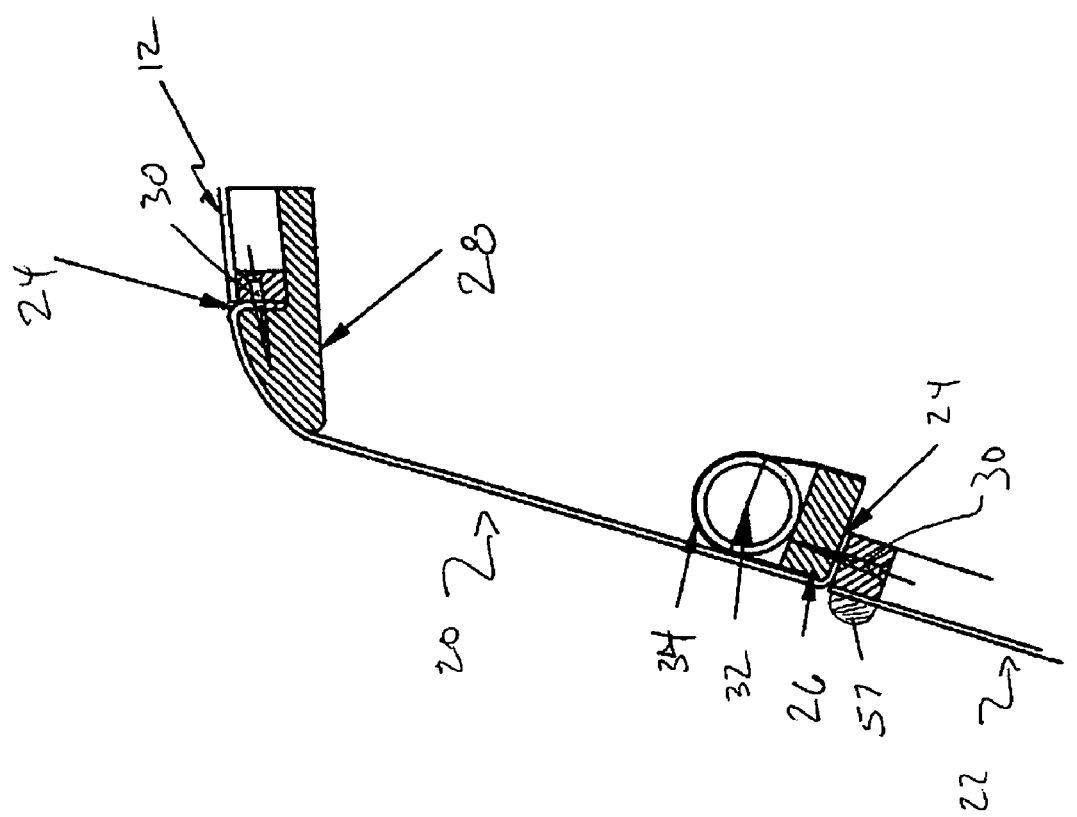

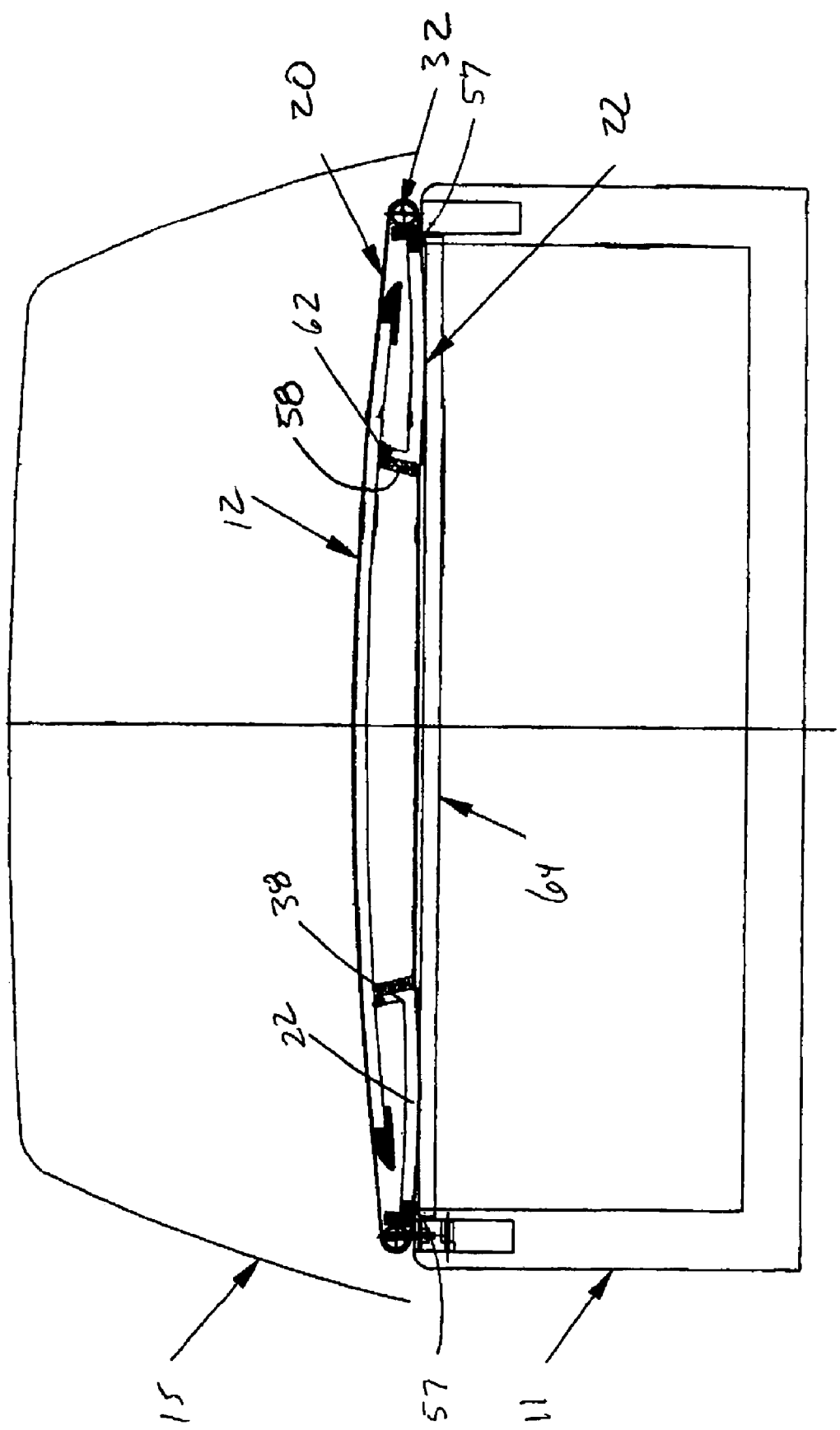

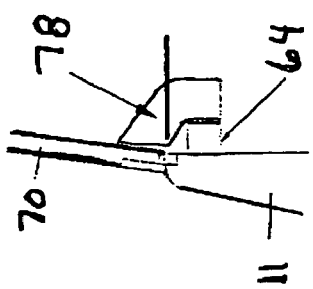
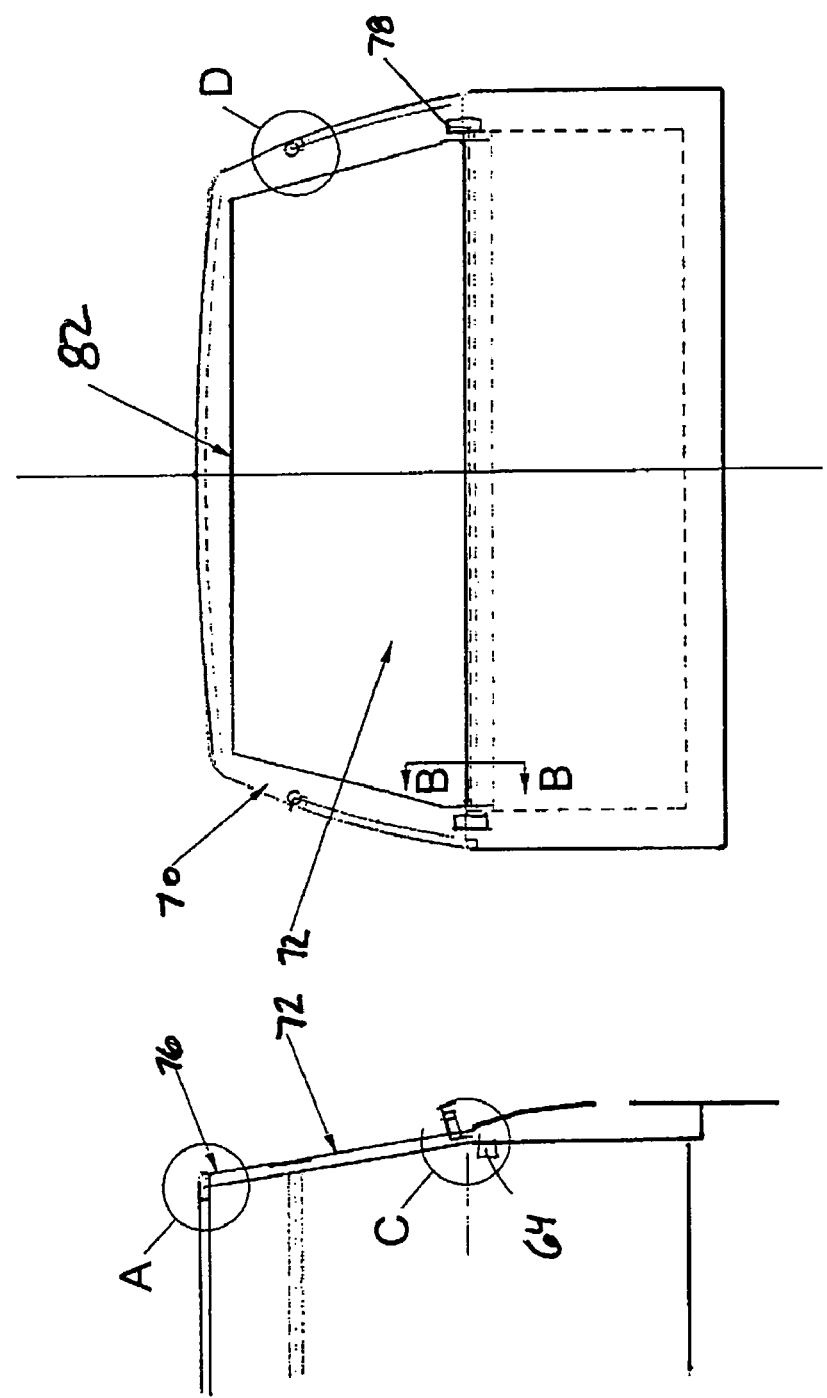
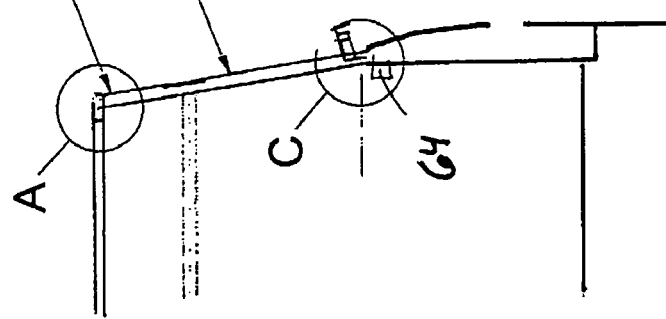

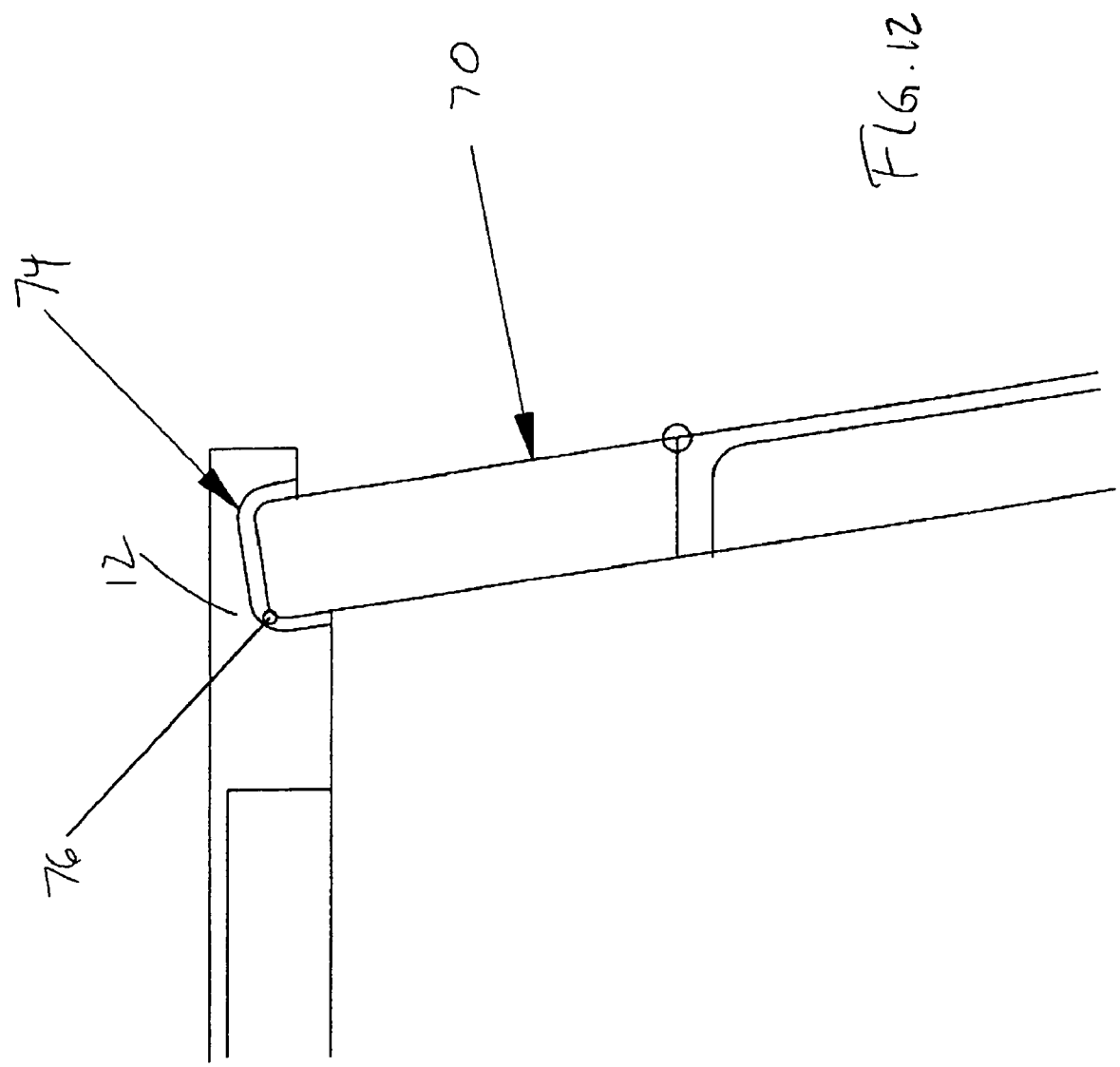

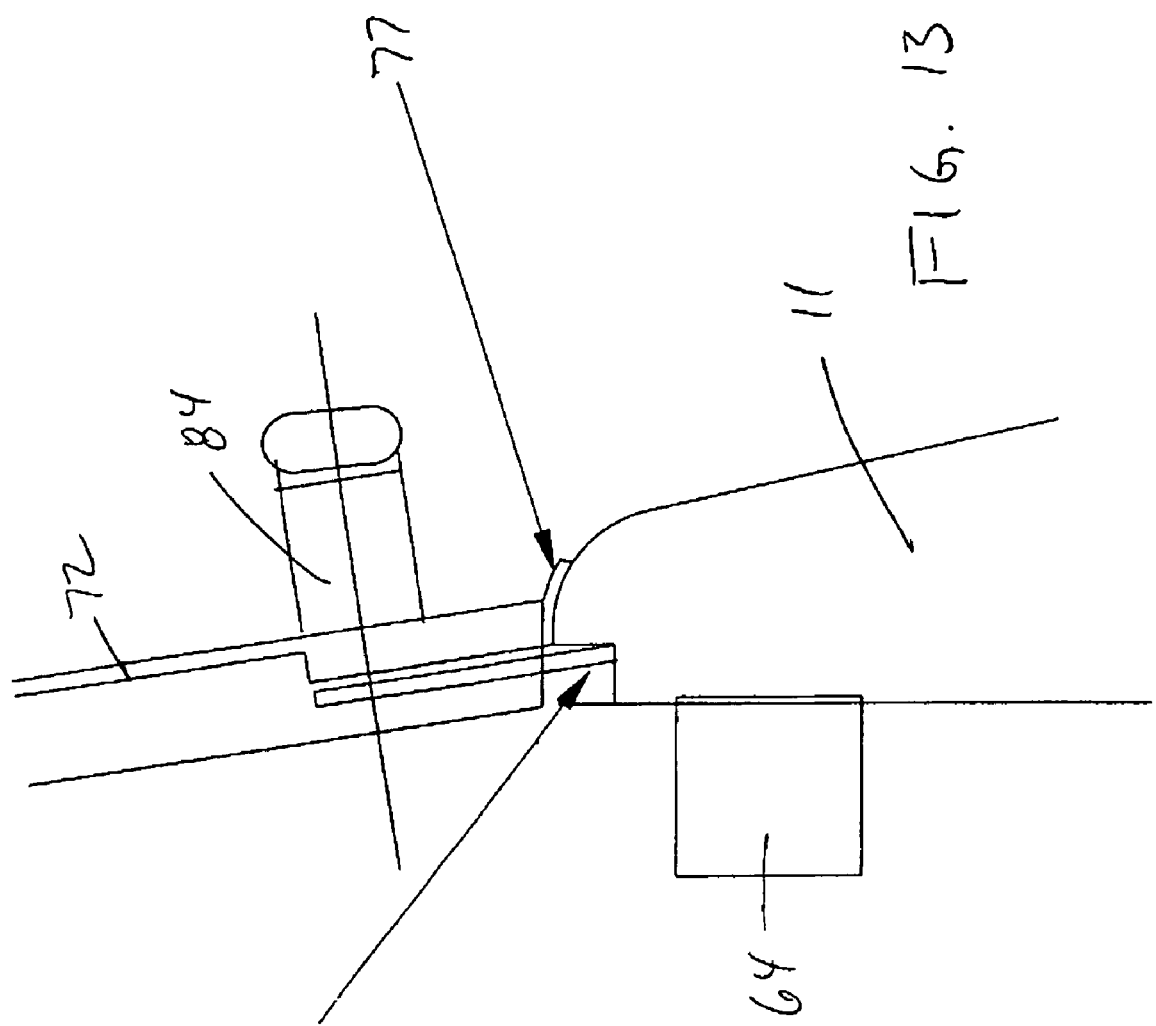

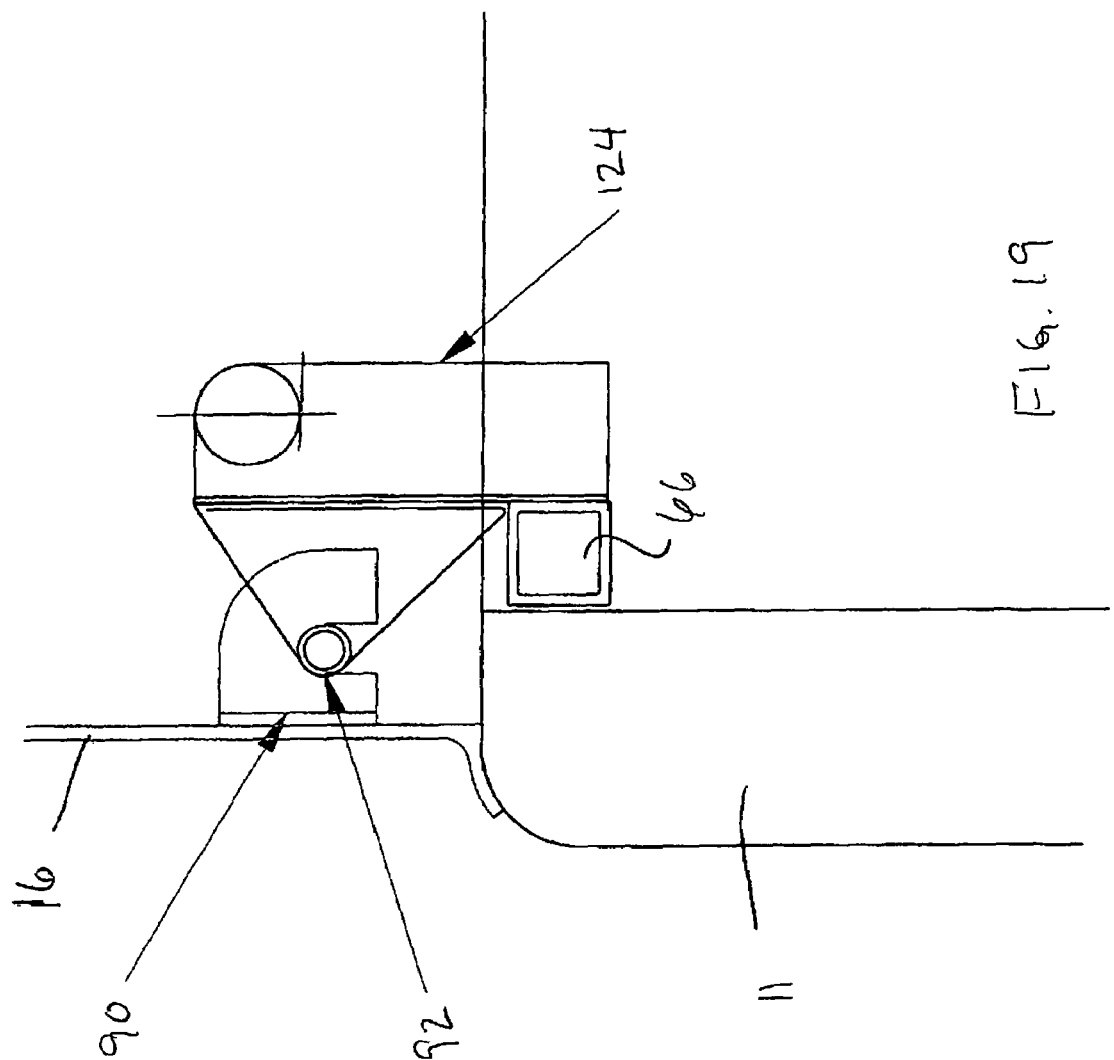

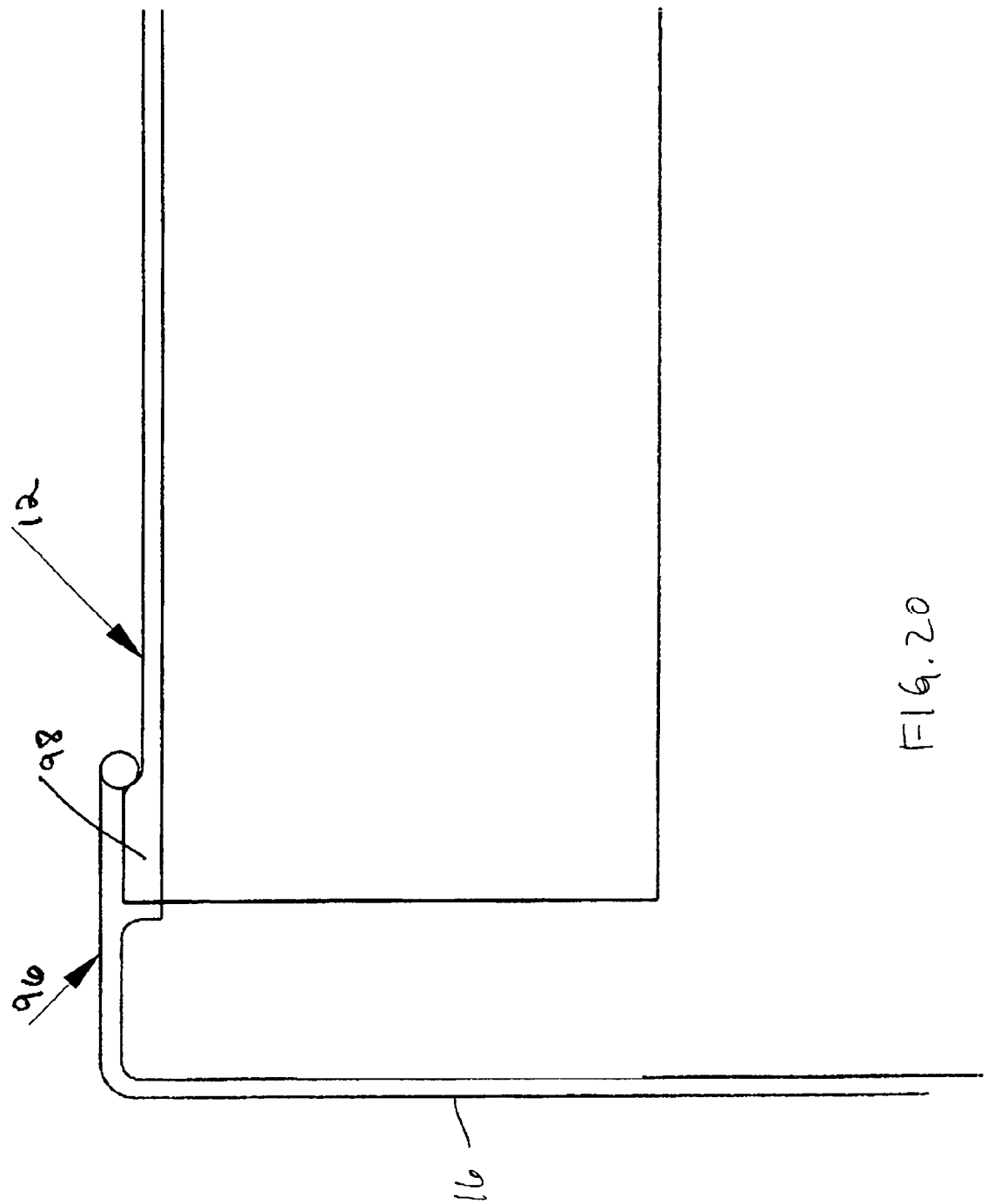

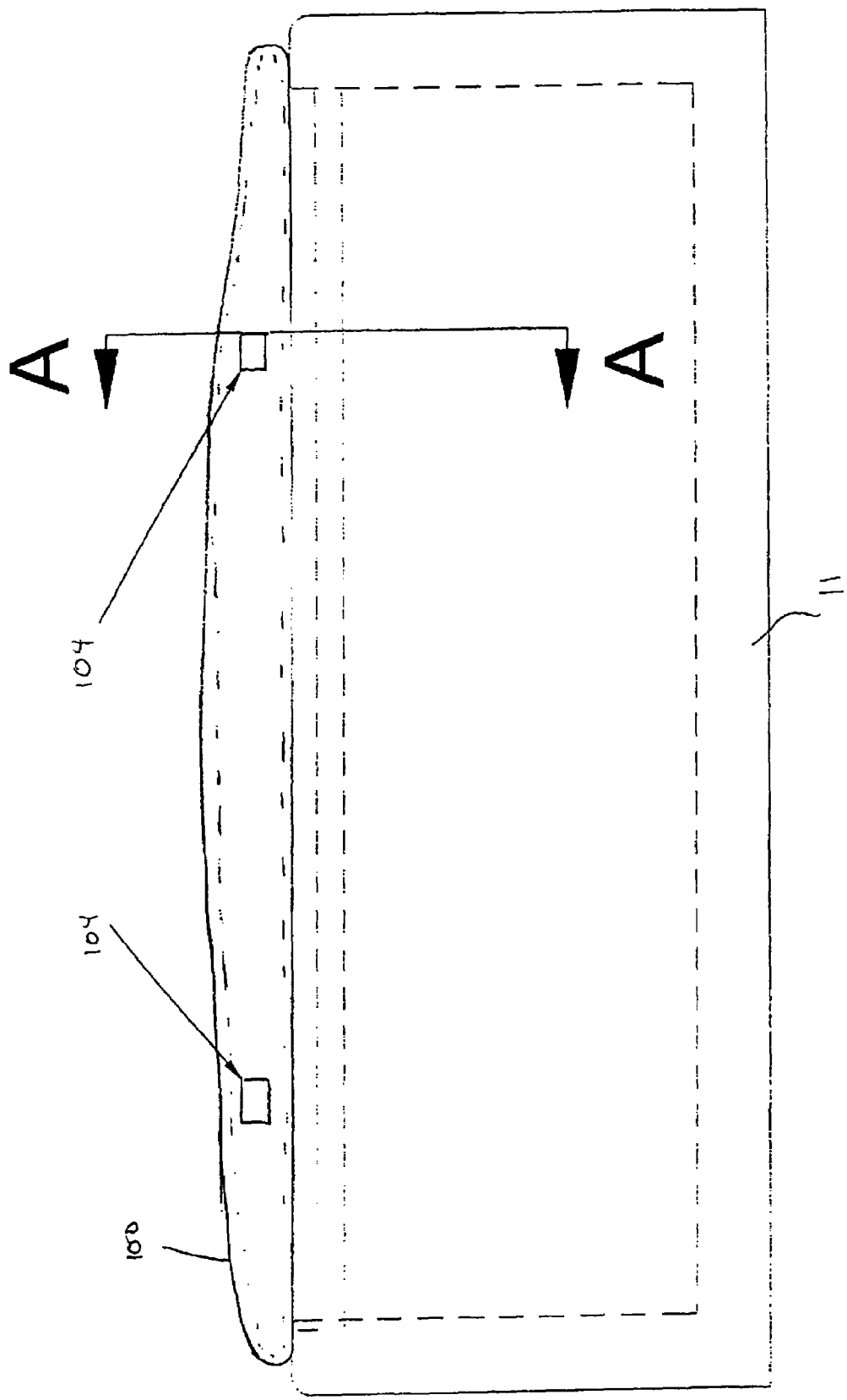

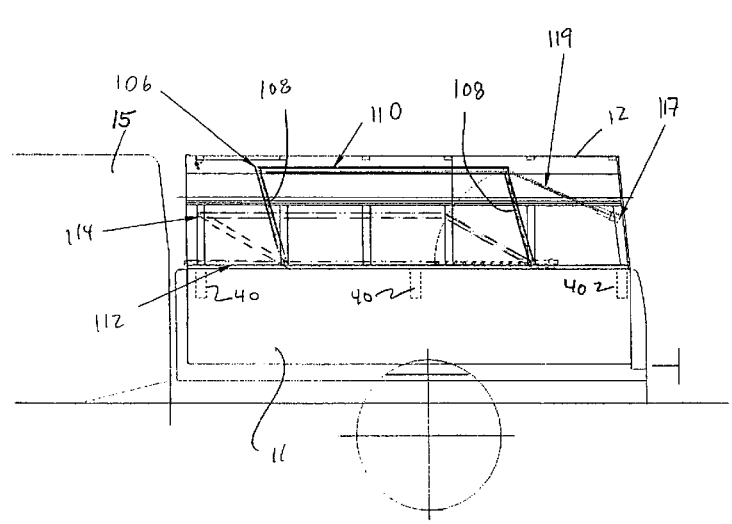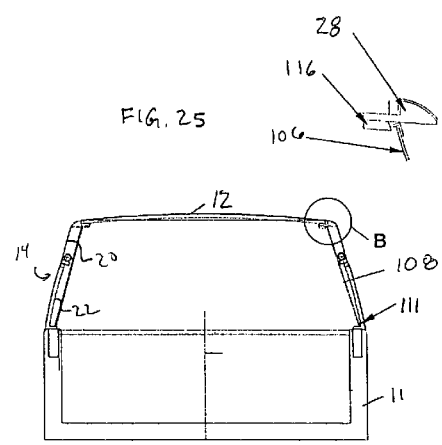
FIG. 23
FIG. 24
FIG. 25

CONVERTIBLE CAP/COVER ASSEMBLY FOR A PICK-UP TRUCK

FIELD OF THE INVENTION

This invention relates to pick-up truck covers and in particular pick-up truck covers that are convertible from a cap mode to a cover mode.

BACKGROUND OF THE INVENTION

Covers for the boxes of pick-up trucks are well known. There tends to be two types of covers generally in use. One type of cover typically extends from one sidewall of the truck box to the other. Alternatively the other cover or cap is typically at the same height as the truck cab and is particularly useful when hauling large material. In some designs the cap is higher than the truck cab.

Efforts have been made to incorporate both the cover and the cap in one designs. The challenge is to provide a cover that can readily be converted into a cap and vice versa. A further challenge is to ensure that both configurations or modes are sturdy and stable.

Some of the prior art cap/cover assemblies include assemblies wherein the cover is made from flexible sheet material. An example of such a design is shown in U.S. Pat. No. 4,789,196 issued to Fields on Dec. 6, 1988. Another type of cap/cover assembly is where the extension walls are attachable and detachable. An example of such a design is shown in U.S. Pat. No. 5,316,357 issued to Schroeder on May 31, 1994. Other assemblies include sides that are hingeably attached to the top and cab. An example of such assemblies is shown in U.S. Pat. No. 4,768,824 issued to Andonian on Sep. 6, 1988.

There are advantages and disadvantages associated with each of these assemblies and therefore improvements may be made with each of these assemblies. Accordingly it would be advantageous to provide a cap/cover assembly wherein a portion of the sides is a flexible sheet such that a cap/cover assembly can easily be changed from the cap to the cover configuration. Further it would be advantageous to provide a cap/cover assembly that has a "keystone" arrangement when the assembly is in the stowed or cover configuration. Still further it would be advantageous to provide a cap/cover assembly that includes a spring loaded lift arm to aid the user in moving the assembly from the cover to the cap configuration.

SUMMARY OF THE INVENTION

The present invention is to a cap and cover assembly for use with a pick up truck having a truck box. The assembly includes a top panel and opposing sides. Each side has a flexible side portion hingeably attached to a rigid side portion. The flexible side portion has one side attached to the top panel. The opposing sides are releasably attached to the truck box. The opposing sides have a cover configuration where the sides are in a stowed portion and a cap configuration when the sides are generally upright.

In one embodiment the top panel has a center rail that extends downwardly from the underside of the top panel and the center rail includes a center portion and a sloped side portion. The rigid side portion is generally L-shaped in cross section with an elongate side portion and a bottom rail portion and wherein the bottom rail portion is releasably attached to the truck box when the sides are in the cap configuration. The center rail is sized such that when the assembly is in the cover configuration the bottom rail portion of the rigid side portion is in a keystone arrangement and tensions the flexible side portions.

In another aspect of the invention a cap and cover assembly is for use with a pick up truck having a truck box. The cap and cover assembly includes a top panel, opposing sides and a spring loaded lift arm. Each side is hingeably attached to the top panel and releasably attachabe to the truck box and wherein the opposing sides have a cover configuration where the sides are in a stowed portion and a cap configuration when the sides are generally upright. The spring loaded lift arm is operably connected to the top panel and is adapted to aid in converting the cap and cover assembly from the cover configuration to the cap configuration.

Further features of the invention will be described or will become apparent in the course of the following detailed description.

BRIEF DESCRIPTION OF THE DRAWINGS

The invention will now be described by way of example only, with reference to the accompanying drawings, in which:

FIG. 5 is an enlarged sectional view of the flexible panel of the convertible cap/cover assembly;

FIG. 6 is a sectional view similar to that shown in FIG. 4 but showing the convertible cap/cover assembly in the cover configuration;

FIG. 9 is a back sectional view of the truck cap rear panel showing the convertible cap/cover assembly in the cap configuration;

FIG. 10 is a side sectional view of a truck cap rear panel showing the convertible cap/cover assembly in the cap configuration;

FIG. 11 is an enlarged view of the truck cap rear panel taken along line B—B of FIG. 9;

FIG. 12 is an enlarged detail of the truck cap rear panel showing the hatch frame detail of A in FIG. 10;

FIG. 13 is an enlarged detail of the truck cap rear panel showing the T-handle latch detail of C in FIG. 10;

FIG. 19 is an enlarged detail of the truck cap front panel showing the front bottom attachment detail of F in FIG. 18;

FIG. 20 is an enlarged detail of the truck cap front panel showing the front top attachment detail of G in FIG. 18;

FIG. 21 is a front sectional view of the truck cover front panel showing the convertible cap/cover assembly in the cover configuration;

FIG. 23 Is a side sectional view of the three bar link of the convertible cap/cover assembly showing the three bar link in the stowed and partially raised positions in phantom;

FIG. 24 is a back sectional view of the three bar link of the convertible cap/cover assembly;

FIG. 25 is an enlarged detail of attachment of the three bar link to the top panel of the convertible cap/cover assembly of the detail B from FIG. 24;

DETAILED DESCRIPTION OF THE INVENTION

Figure 1:
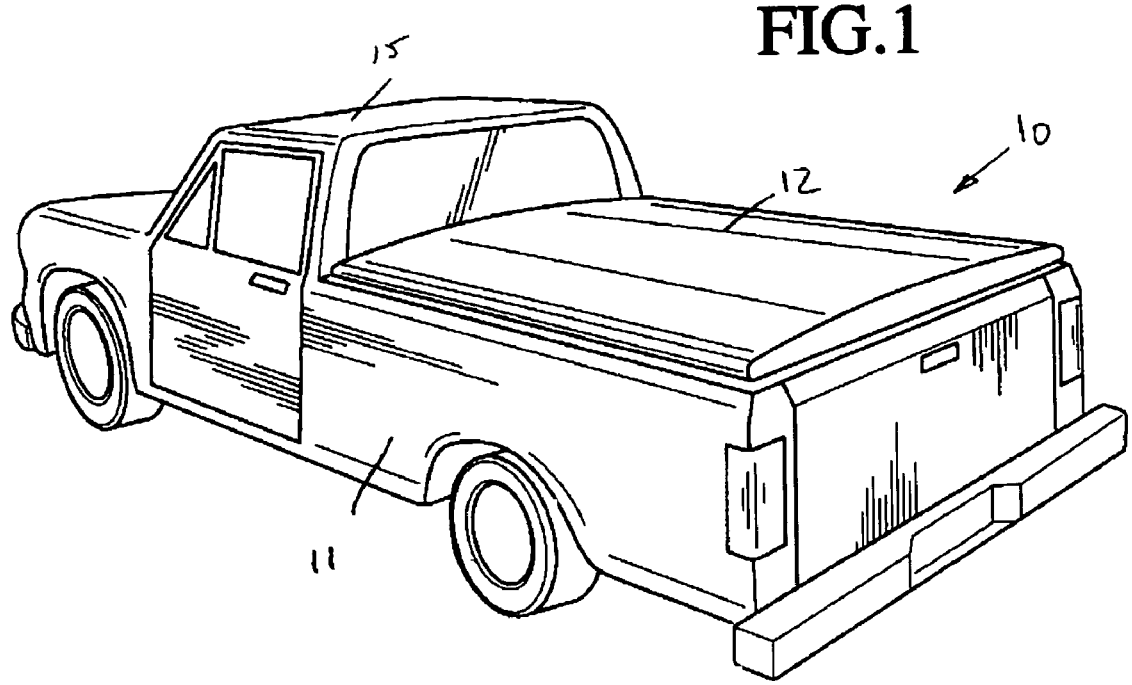
FIG. 1 is a perspective view of the convertible cap/cover assembly for a pick-up truck constructed in accordance with the present invention and shown in the cover configuration.
Figure 2:
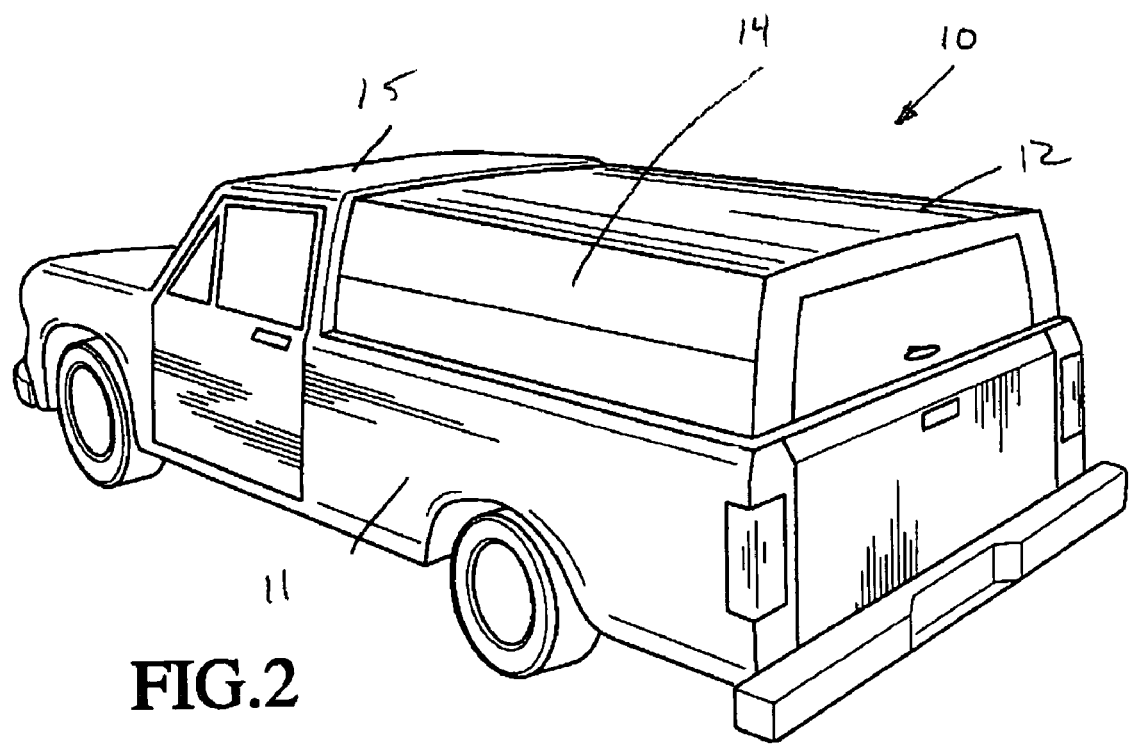
FIG. 2 is a perspective view of the convertible cap/cover assembly for a pick-up truck constructed in accordance with the present invention and shown in the cap configuration.
Figure 3:
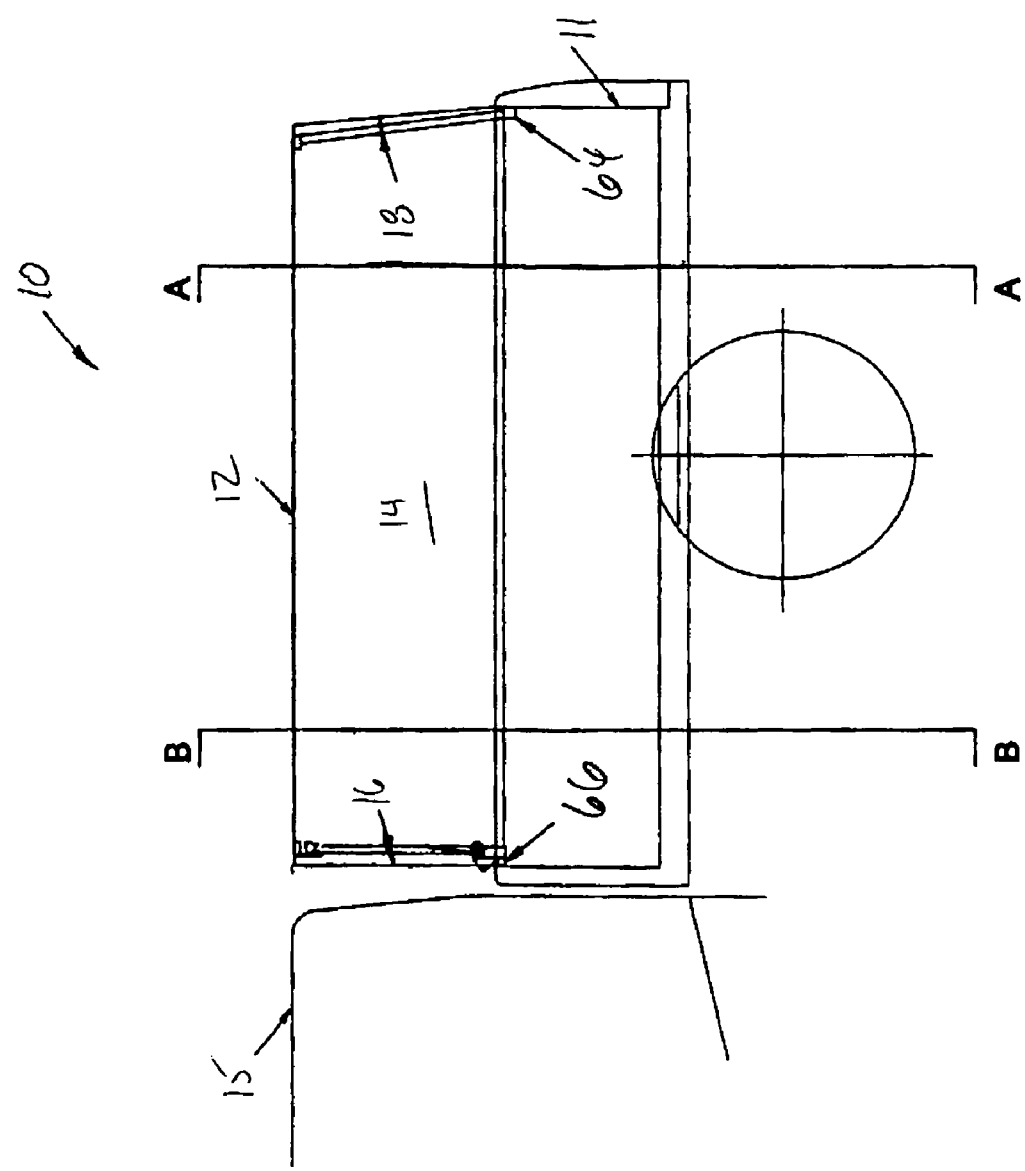
FIG. 3 is a side sectional view along the centre line of the convertible cap/cover assembly in the cap configuration.
Figure 4:
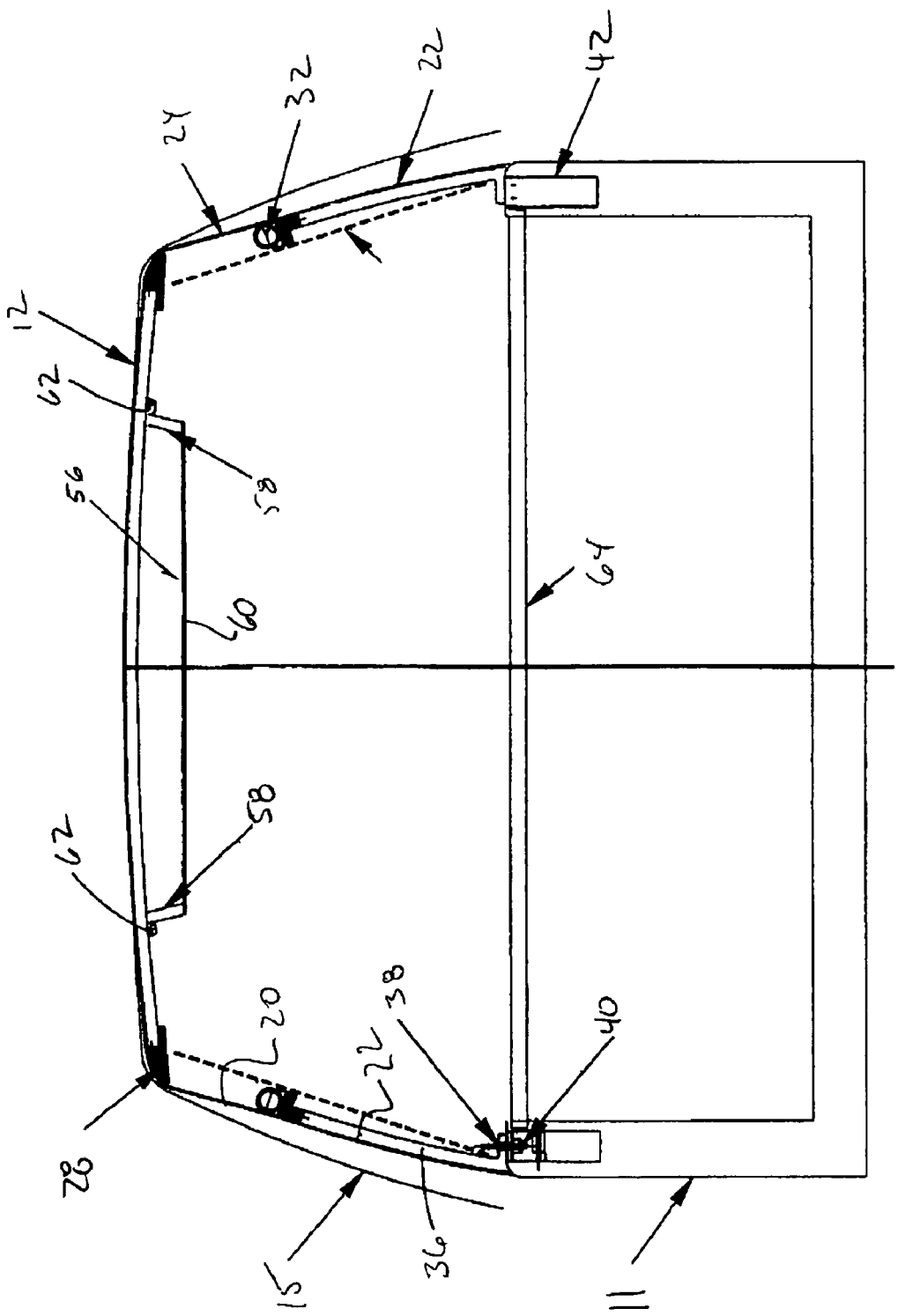
FIG. 4 is an end sectional view of the convertible cap/cover taken along line A—A of FIG. 3 showing the cap/cover assembly in the cap configuration.

Referring to figures, the cap/cover assembly is shown generally at 10. The cap/cover assembly 10 is adapted to be attached to a truck which includes a truck box 11 and a truck cab 15. The cap/cover assembly 10 includes a top panel 12, a pair of sides 14, a front cap panel 16 and a rear cap panel 18. Each side 14 includes a flexible side panel 20 and rigid side panel 22, as best seen in FIGS. 4 to 6. The cap/cover assembly has a cover configuration shown in FIG. 1 and a cap configuration shown in FIG. 2.

Referring to FIGS. 4 to 8, the flexible side panel 20 is hingeably attached to the rigid side panel 22. Each flexible side panel 20 includes a flexible sheet 24, a longitudinal lower sheet rail 26 and a longitudinal upper outer rail 28, as best seen in FIG. 5. The flexible sheet 24 is anchored between the longitudinal lower sheet rail 26 and the rigid side panel 22. A plurality of screws 30 attach the rigid side panel to the longitudinal lower sheet rail 26. Similarly a plurality of screws 30 attach the longitudinal upper outer rail to the top panel 12. The lower sheet rail 26 has a hinge tube 32 attached thereto with a plurality of sheet metal straps 34.

Figure 8:
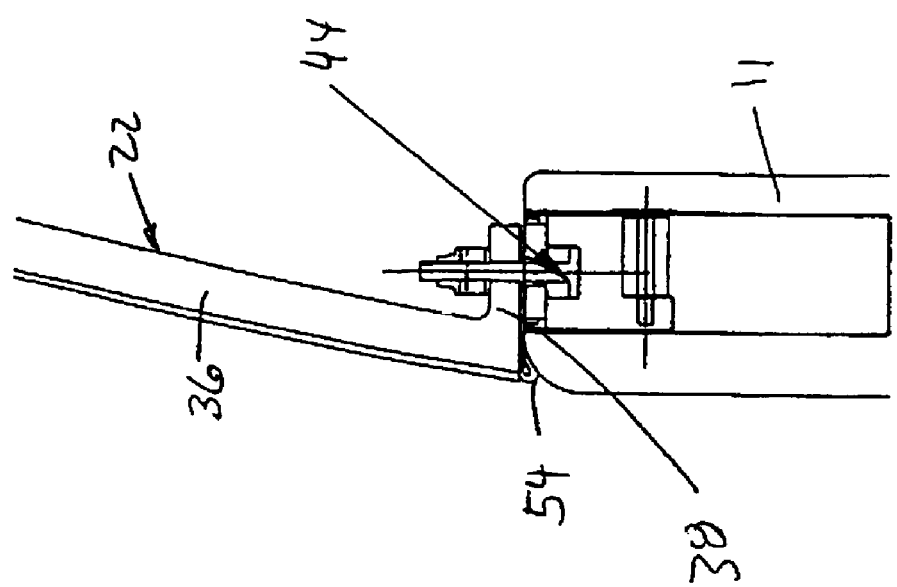
FIG. 8 is an enlarged detail of the stake pocket cam locks of FIG. 7 but shown in the locked position.
Figure 7:
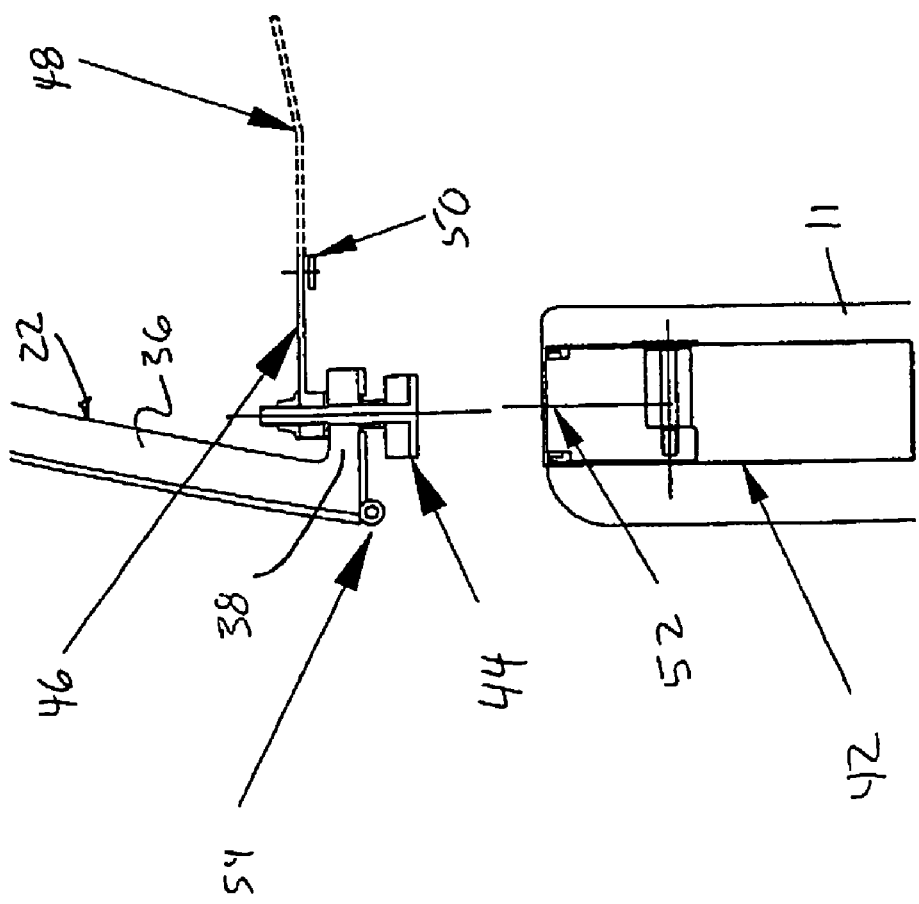
FIG. 7 is an enlarged detail of the stake pocket cam locks shown in the unlocked position.
Figure 14:
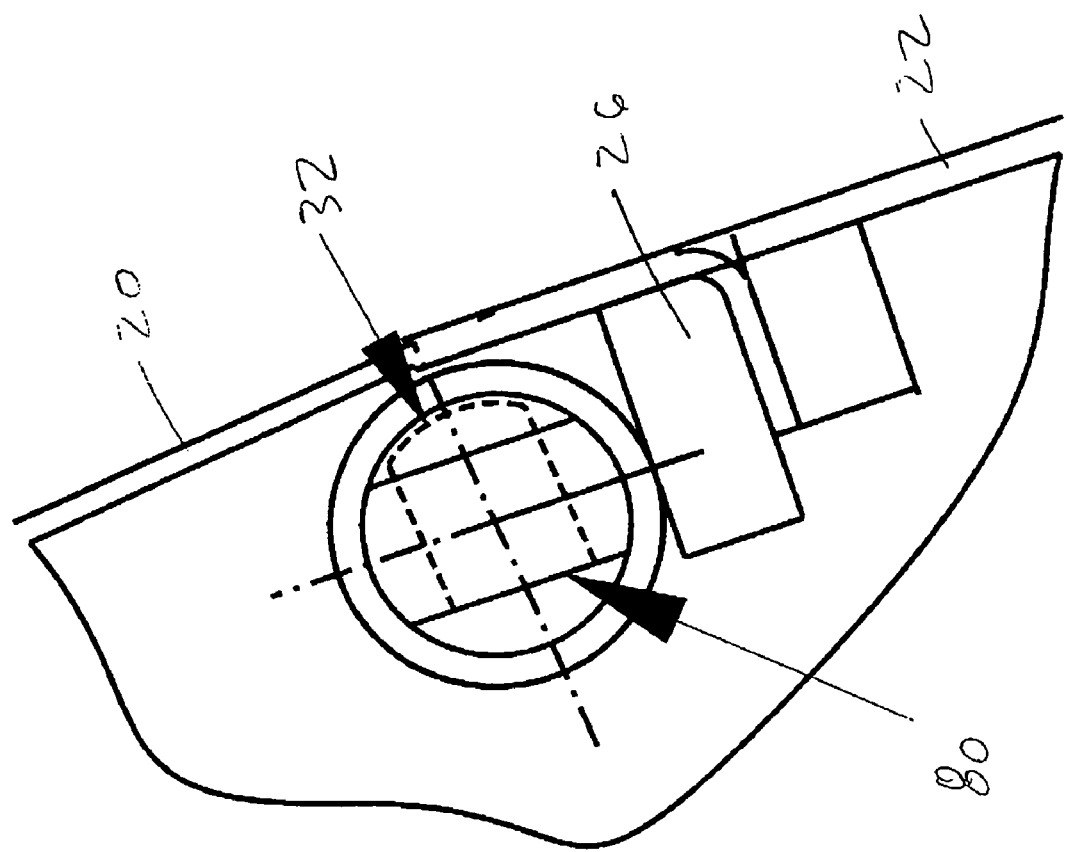
FIG. 14 an enlarged detail of the truck cap rear panel showing the attachment to the hinge tube of the side panel detail of D in FIG. 9.
Figure 38:
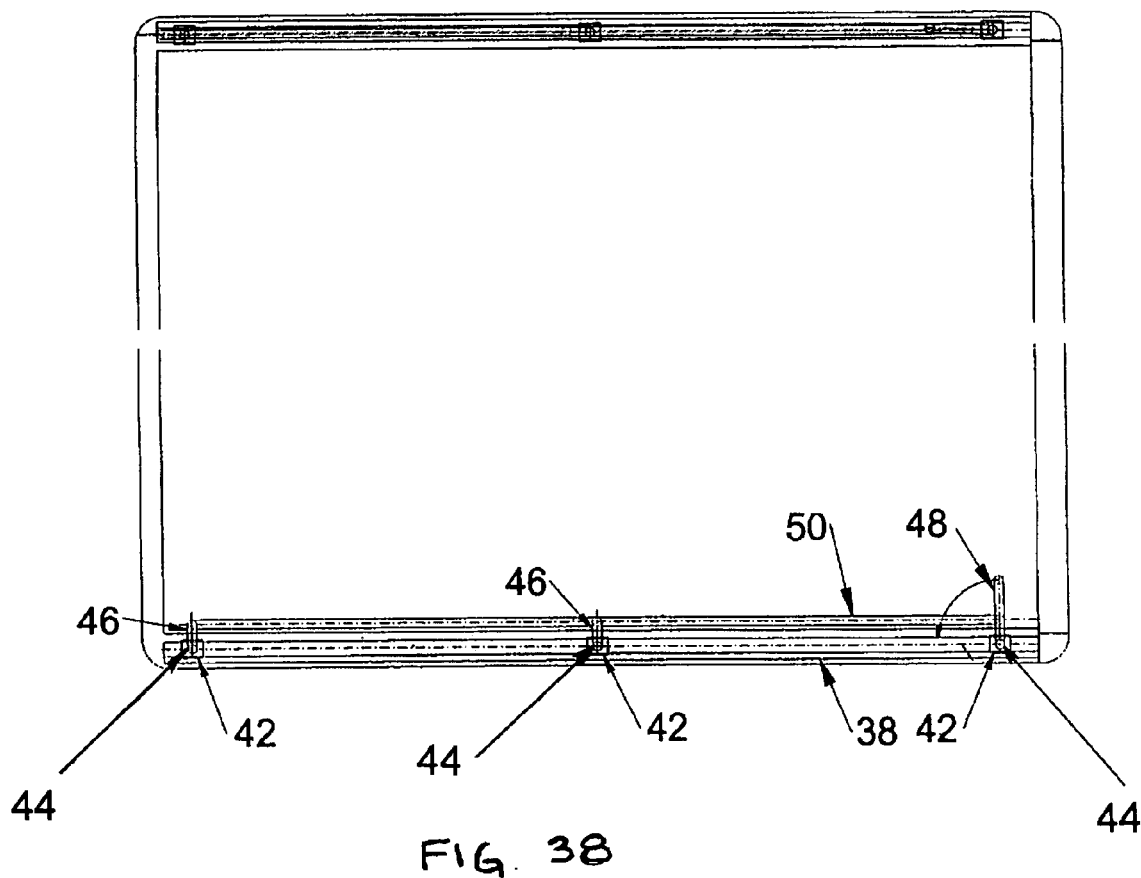
FIG. 38 shows a detail of the stake pocket cam locks in which the stake cam includes a lever and a plurality of stake cams along one side are ganged together.

Referring specifically to FIGS. 7, 8 and 38, the rigid side panel 22 is generally L-shaped with an elongate side portion 36 and an integrally attached bottom rail portion 38. Stake pocket locks 40 are used to lock the rigid side panel 22 in place in the cap configuration. Stake pocket locks 40 are positioned in stake pockets 42. Details of stake pocket locks 40 are shown in FIGS. 7 and 8. The stake pocket locks 40 include a rectangular stake cam 44 which is positioned with a lever 46. A master lever 48 is connectable to the lever 46 with a connecting rod 50. The stake pocket 42 has rectangular slot 52 for receiving the rectangular stake cam 44. A rubber seal 54 is positioned at one end of the rigid side panel 22 such that when in position there is provided a seal between the rigid side panel 22 and the truck box 11. In use the stake locks 40 are ¼ turn type fasteners. A plurality of stake cams 44 through the attached levers 46 may be ganged together so that they can be operated by a master lever 48 located at the rear stake pocket 42. The levers 46 are normal to the cap side when the locks are free and the master lever 48 is pushed into an over-center position (just past parallel to the truck side) in the locked position. It will be appreciated by those skilled in the art that the number of stake locks 40 that are required will depend on the length of the truck box 11. For long truck boxes typically three stake locks 40 per side will be adequate and for short truck boxes two stake locks 40 per side will be adequate.

The top panel 12 has a top center rail 56 along the center thereof. Center rail 56 has sloped side portions 58 a center portion 60 which is spaced downwardly from the top panel 12. The sloped sides 58 engage the bottom rail portion 38 of the rigid side panel 22 when the cap/cover 10 is in the cover configuration as shown in FIG. 6.

In the cover configuration shown in FIG. 6 the bottom rail portion 38 of the rigid side panels 22 make contact with the sloped side portions 58 of center rail 56 and the weight of the top panel 12 forces the angled rails down between the side panels, pushing them outward (the 'keystone' principle or arrangement). This outward movement is resisted by tension in the flexible panels 20 and the assembly is held in a generally rigid configuration. The outward movement and the depth of engagement of the keystone feature is limited by stops 62. Stops 62 are attached to the underside of the top panel 12 proximate to the sloped side portions 58 of the centre rail 56, as best seen in FIG. 4. Front and rear covers are attached as described in more detail below.

In the cover configuration the sides are folded under the top panel with the flexible panel 20 wrapped around a hinge tube 32 that defines the outer edge of the cover. In the cover configuration, the rear edges of the side panels 14 rest on a rear lateral bar 64 and a front lateral bar 66, shown in FIG. 6. The rear lateral bar 64 is fixed just below the top lip of the pick-up truck box 11 at the rear and similarly the front lateral bar 66 is fixed just below the forward edges. A seal 57 (shown in FIG. 5) is provided along the upper edge of the rigid side panel 22 to seal the assembly when it is in the cover configuration. The seal 57 will be compressed onto the top edge of the truck box 11 when in the cover configuration.

The back of the cap/cover assembly 10 is covered with one of the rear cap panel 18 or a rear cover panel 86 depending on whether it is in the cap configuration or the cover configuration. The cap configuration is shown in FIGS. 9 through 14 and the cover configuration is shown in FIGS. 15 and 16.

Referring to FIGS. 9 through 14, the truck cap rear panel 18 consists of a hatch frame 70 and a hatch 72. The top portion of the hatch frame 70 snaps into groove 74 formed in the trailing edge of the rigid top panel 12 as best seen in FIG. 12. A seal 76 is provided between the groove 74 and the hatch frame 70. Similarly grooves are provided in the rigid side panels 22. A bottom seal 77 is provided between the hatch 72 and the tail gate of truck box 11 as best seen in FIG. 13. Brackets 78 hook over the rear lateral bar 64 as best seen in FIG. 11. The rear cap panel 18 is secured to hinge tube 32. It may be secured to hinge tube 32 with a hinge tube lock 80 such as SPAE-NAUR part #D-141KA (best seen in FIG. 14). Hinge tube 32 is provided with a slot and lock 80 is rotated to lock so that it engages the slot and secures the rear cap panel 18 to the hinge tubes 32. The hatch 72 has a continuous hinge 82 along the top edge and latch 84 to secure it to the tail gate of the truck box 11. Preferably latch 84 is similar to the SPAE-NAUR part #096-240. To lock latch 84 to the tail gate of the truck box 11 the tee handle is turned ¼ turn and the latch engages behind the top lip of the tail gate of the truck box 11 as best seen in FIG. 13.

Figure 15:
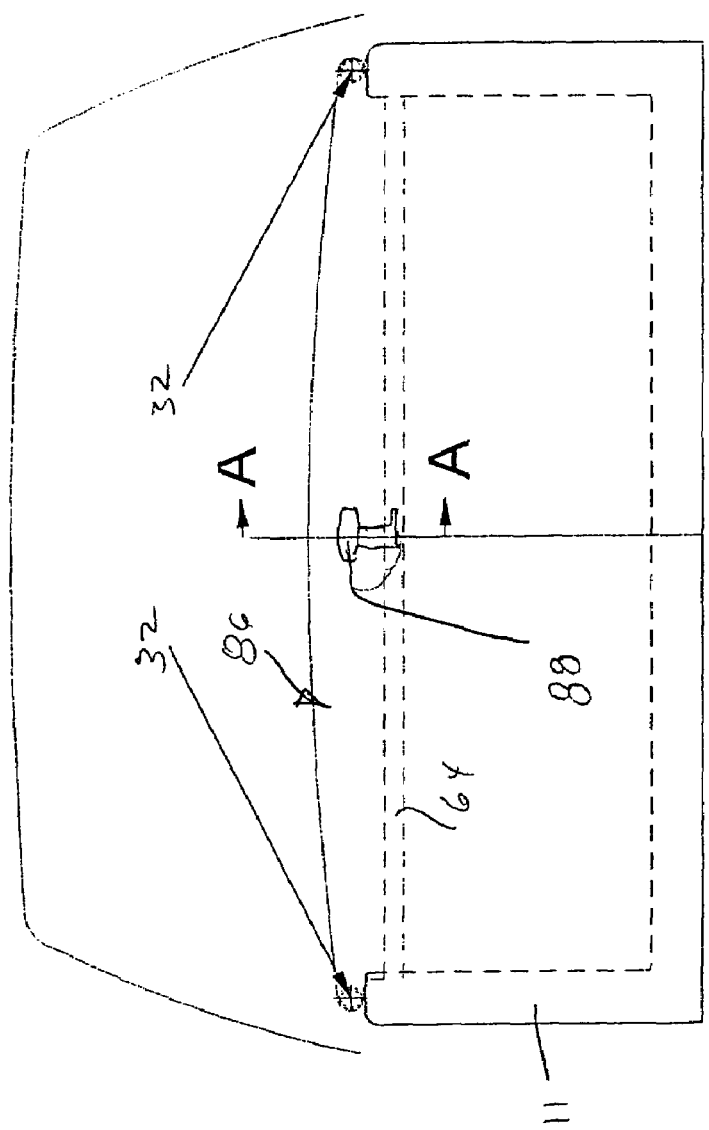
FIG. 15 is a back sectional view of the truck cover rear panel showing the convertible cap/cover assembly in the cover configuration.
Figure 16:
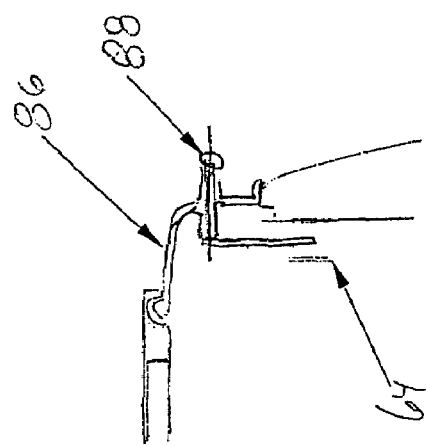
FIG. 16 is a side sectional view of a truck cover rear panel showing the convertible cap/cover assembly in the cover configuration.
Figure 18:
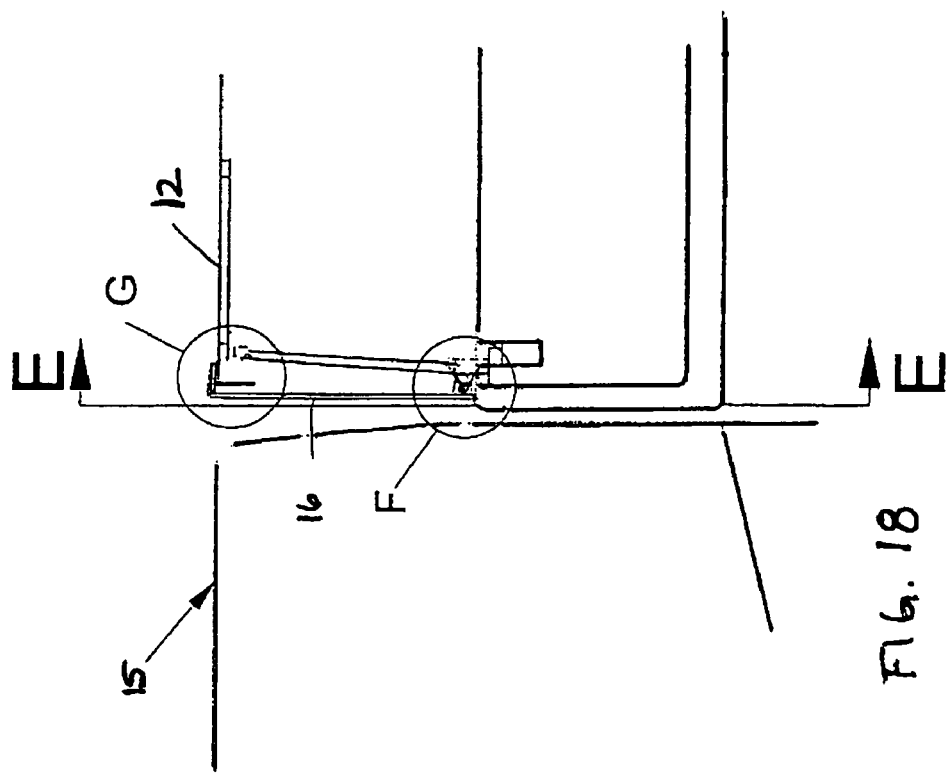
FIG. 18 is a side sectional view of a truck cap rear panel showing the convertible cap/cover assembly in the cap configuration.
Figure 17:
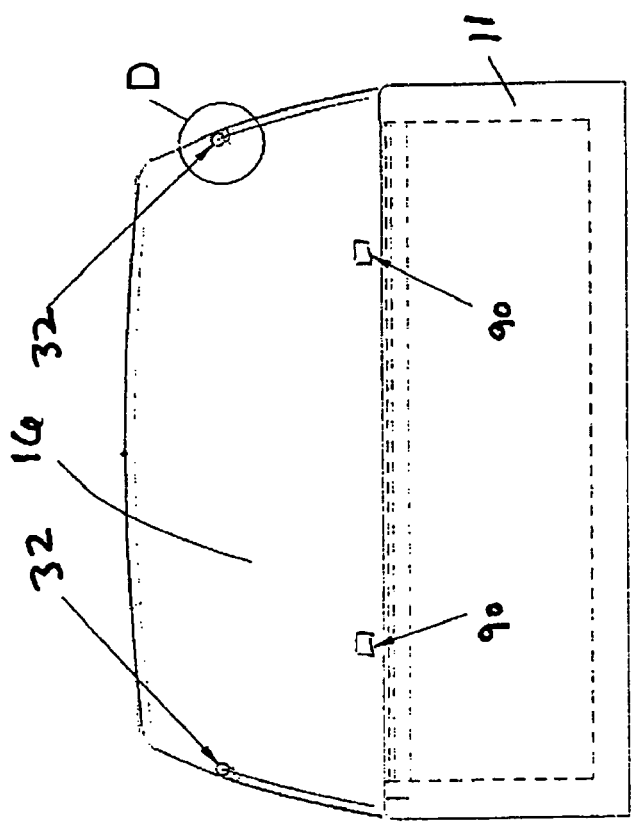
FIG. 17 is a front sectional view of the truck cap front panel showing the convertible cap/cover assembly in the cap configuration.

In the cover configuration shown in FIGS. 15 and 16, the rear cover panel 86 is retained in a similar manner to the rear cap panel 18. The top edge of the rear cover panel 86 snaps into the groove 74 in the rigid top panel 12. The rear cover panel 86 is secured to the hinge tubes 32. Preferably similar cam latches lock the rear cover panel 86 into the ends of the hinge tube 32 as described above. The tee handled latch 88 for the rear cover panel 86 is slightly different from that described above since it latches into a slot in the top of the rear lateral bar 64 to prevent the rear of the cover from being raised.

Referring to FIGS. 17 through 20, the truck front cap panel 16 is similar in concept to the rear cap panel 18. The front cap panel 16 is secured to the hinge tubes 32 using cam latches in a fashion similar to the rear cap panel 18. A ¼ turn of the cam latches lock the front cap panel into the ends of the hinge tubes 32. Front cap panel brackets 90 hook over a bar 92 that is attached to the lift arm hinge brackets 124 which is described in more detail below. The lift arm hinge bracket 124 is attached to the front lateral bar 66. The outer edge of the front cap panel 16 is formed into a lip 96 which fits over the cap/cover assembly and latches over ridges 98 on the outside of the rigid top panel 12 (as best seen in FIG. 20) and sides 14.

Figure 22:
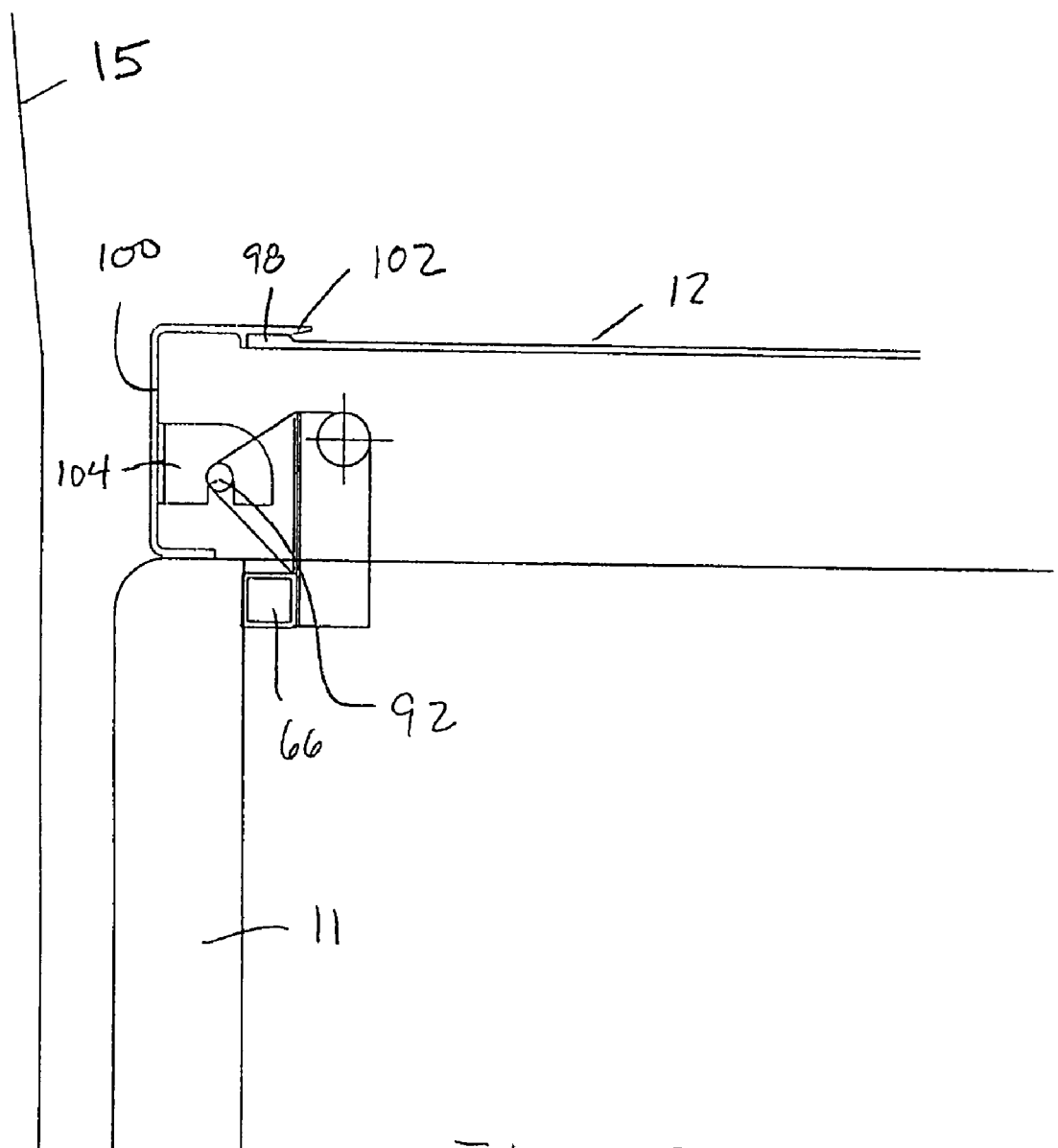
FIG. 22 is an enlarged sectional view of the truck cover front panel taken along line A—A in FIG. 21.
Figure 26:
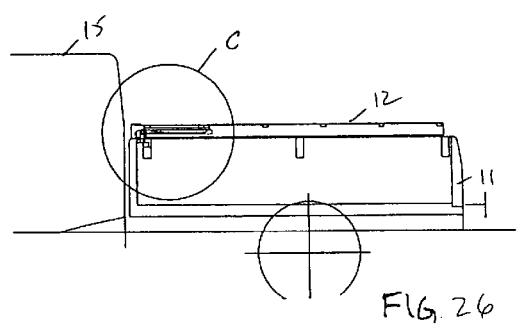
FIG. 26 is a side sectional view of the convertible cap/cover assembly, showing the cap/cover assembly in the cover configuration.
Figure 27:
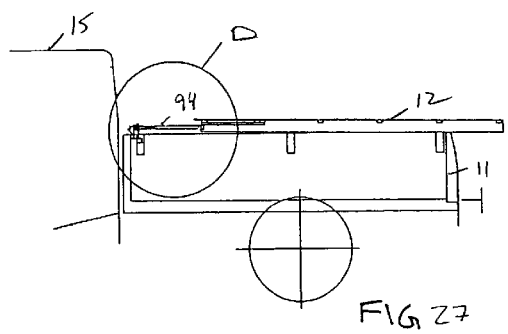
FIG. 27 is a side sectional view of the convertible cap/cover assembly, showing the cap/cover assembly in the first stage of the transition from the cover to the cap configuration.
Figure 28:
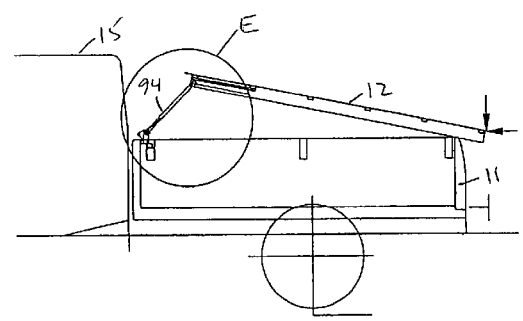
FIG. 28 is a side sectional view of the convertible cap/cover assembly, showing the cap/cover assembly in the second stage of the transition from the cover to the cap configuration.
Figure 29:
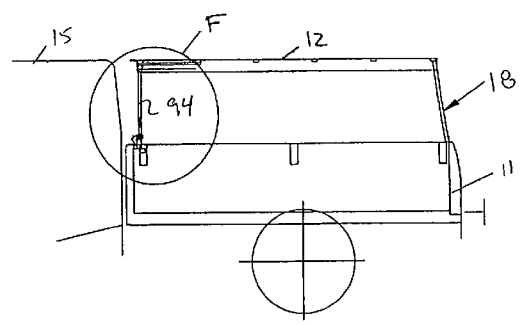
FIG. 29 is a side sectional view of the convertible cap/cover assembly, showing the cap/cover assembly in the cap configuration.

The front cover panel 100 is retained in a somewhat similar fashion. The outer edge 102 (shown in FIG. 22) of the front cover panel 100 extends over the top panel 12 but the top panel is free to move rearwardly therefrom as the first step in changing the assembly from the cover to the cap. Front cover brackets 104 hook over bar 92 as described above.

Figure 34:
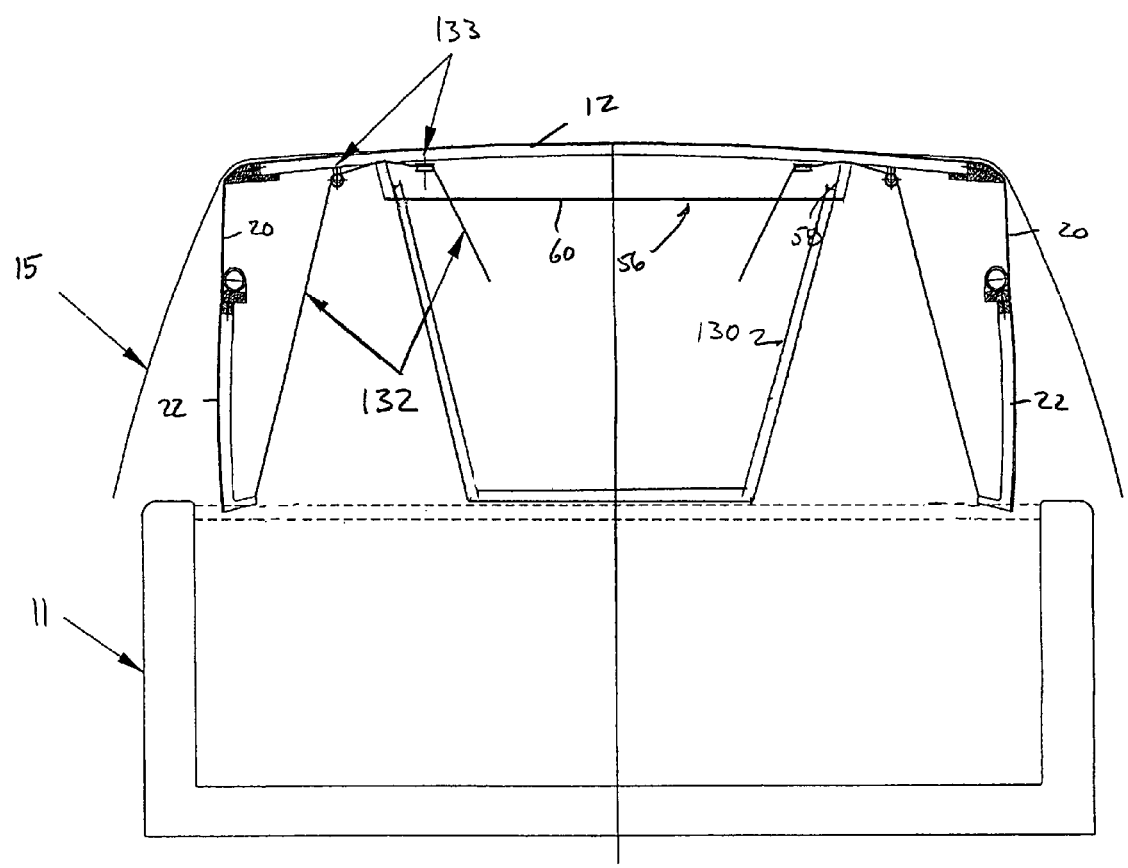
FIG. 34 is a sectional view of the convertible cap/ cover taken along line B—B of FIG. 3 showing the cap/cover assembly in the cap configuration.
Figure 35:
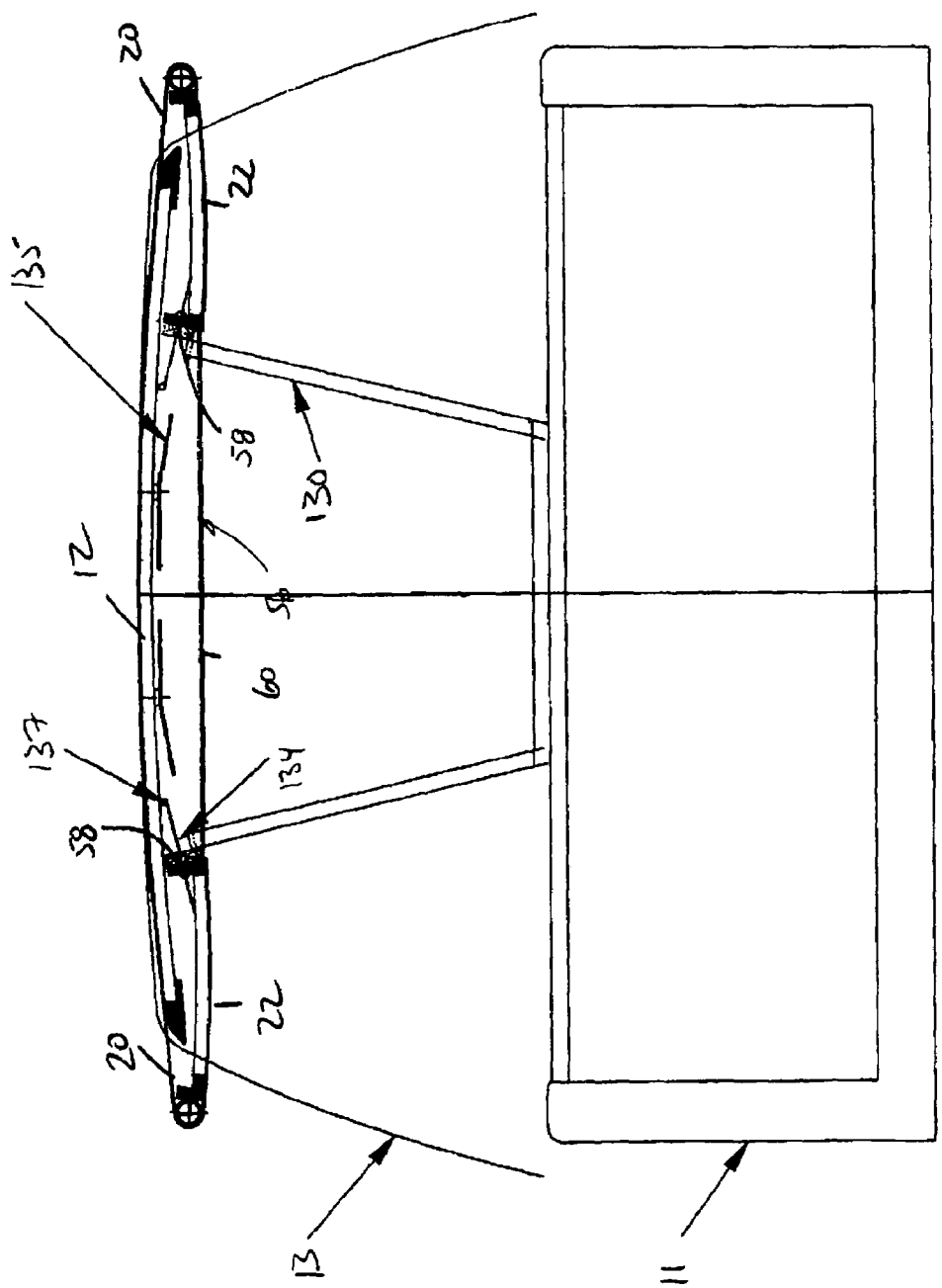
FIG. 35 is an end view of the convertible cap/cover assembly showing the cap/cover assembly in the cap configuration but showing the side panels in the tucked position.
Figure 36:
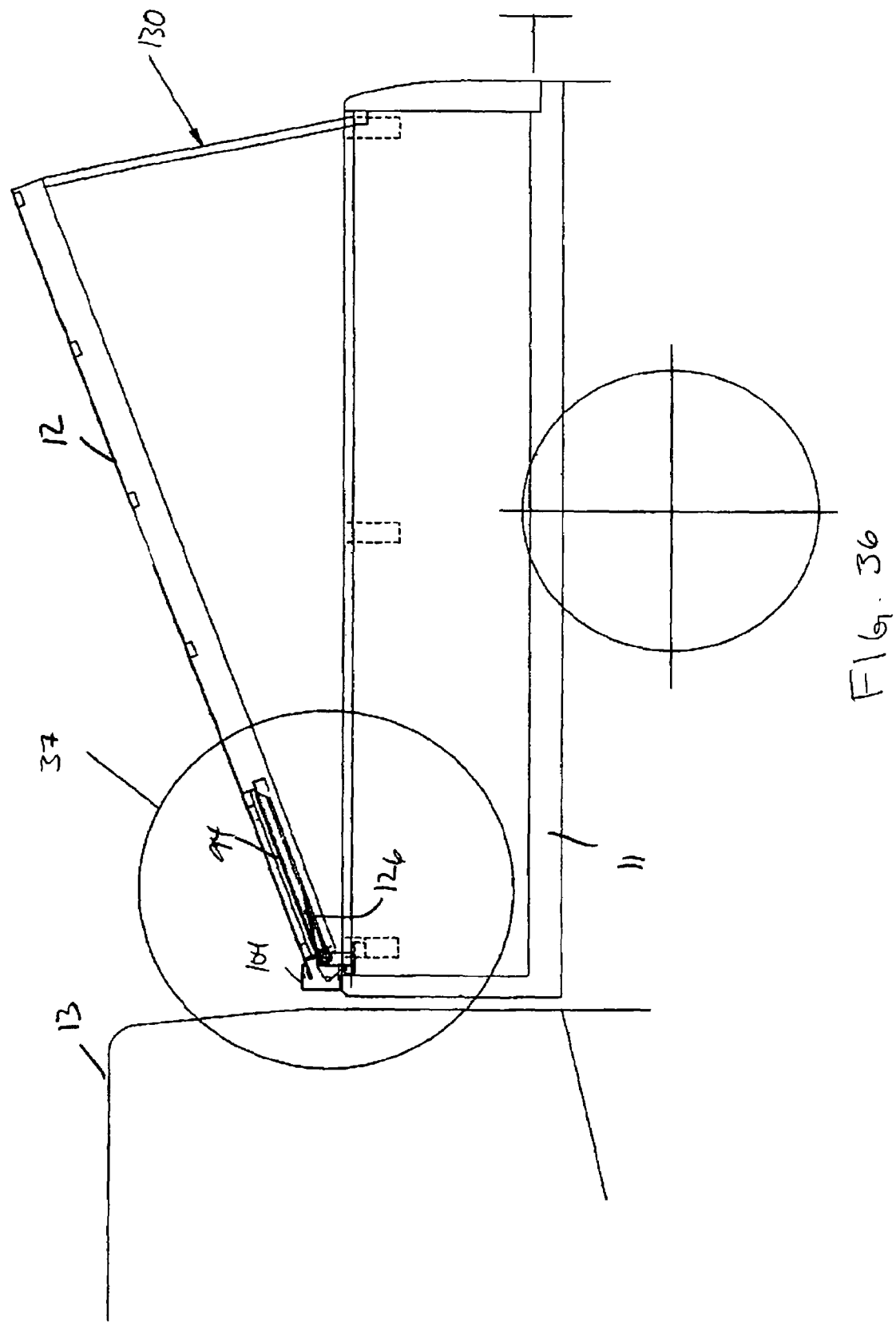
FIG. 36 is a side sectional view of the convertible cap/cover assembly showing the cover in a propped up position.
Figure 37:
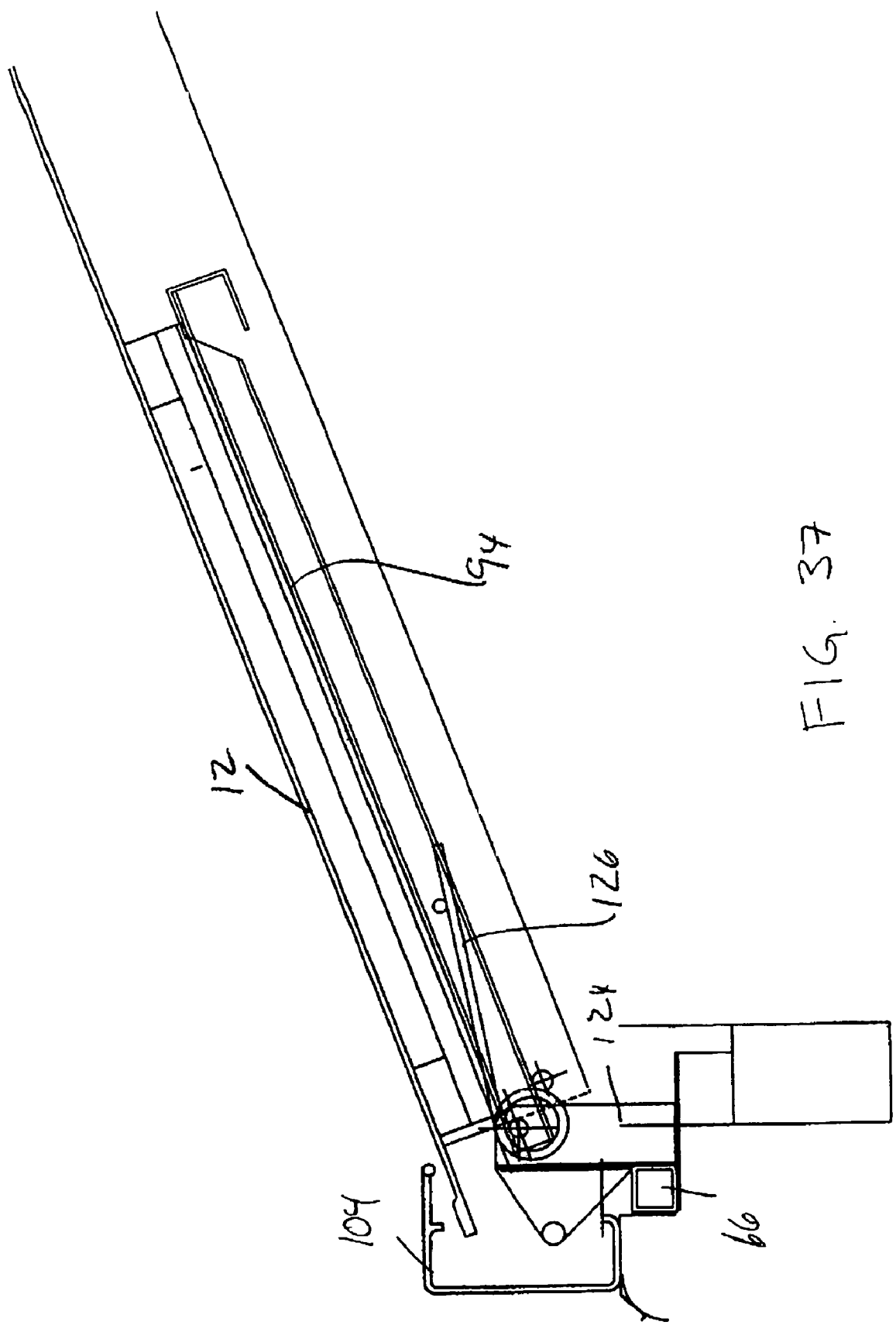
FIG. 37 is an enlarged detail of FIG. 16 of the lift arm end of the convertible cap/cover assembly, showing the cap/cover assembly in a propped up position.

Preferably the sides 14 include further support for example a three bar link support 106. Referring to FIGS. 23 to 25 the three bar link support 106 consists of two rotating links 108 with a connecting link 110. A pivot point 111 for the three bar link support 106 is located on the bottom rail portion 38 of the rigid side panel 22 shown in FIG. 24. In the cover configuration it is stowed horizontally along the bottom rail of the rigid side panel as shown in phantom at arrow 112 in FIG. 23. After raising the cap/cover assembly and before the retractable prop 130 (shown in FIGS. 34 and 35) is removed, the three bar link 106 is raised until the connecting link 110 contacts the underside of the top panel outer rail. Arrow 114 shows the three bar link support 106 in a partially raised position. Once the three bar link 106 is raised it is lodged behind retention blocks 116 attached to the outer rail 28 further rearward movement of the rotating links lifts the outer rail creating a tension in the flexible side panel 20. The three bar link is latched back to the rear edge of the rigid panel at anchor point 117 using an over center latch 119 similar to the SPAE-NAUR part #096-640.

Figure 30:
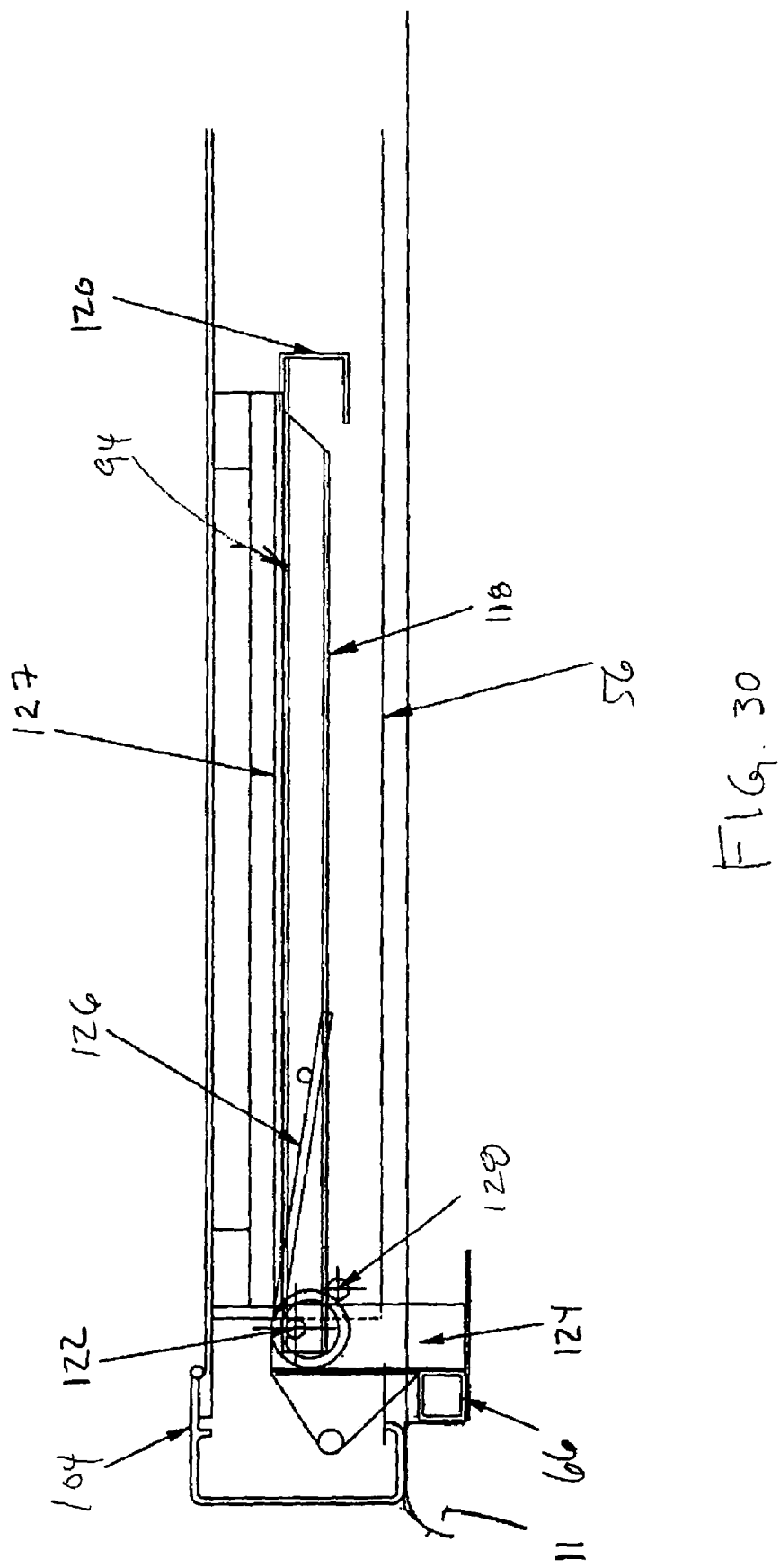
FIG. 30 is an enlarged detail of FIG. 7 of the lift arm of the convertible cap/cover assembly, showing the cap/cover assembly in the cover configuration.
Figure 31:
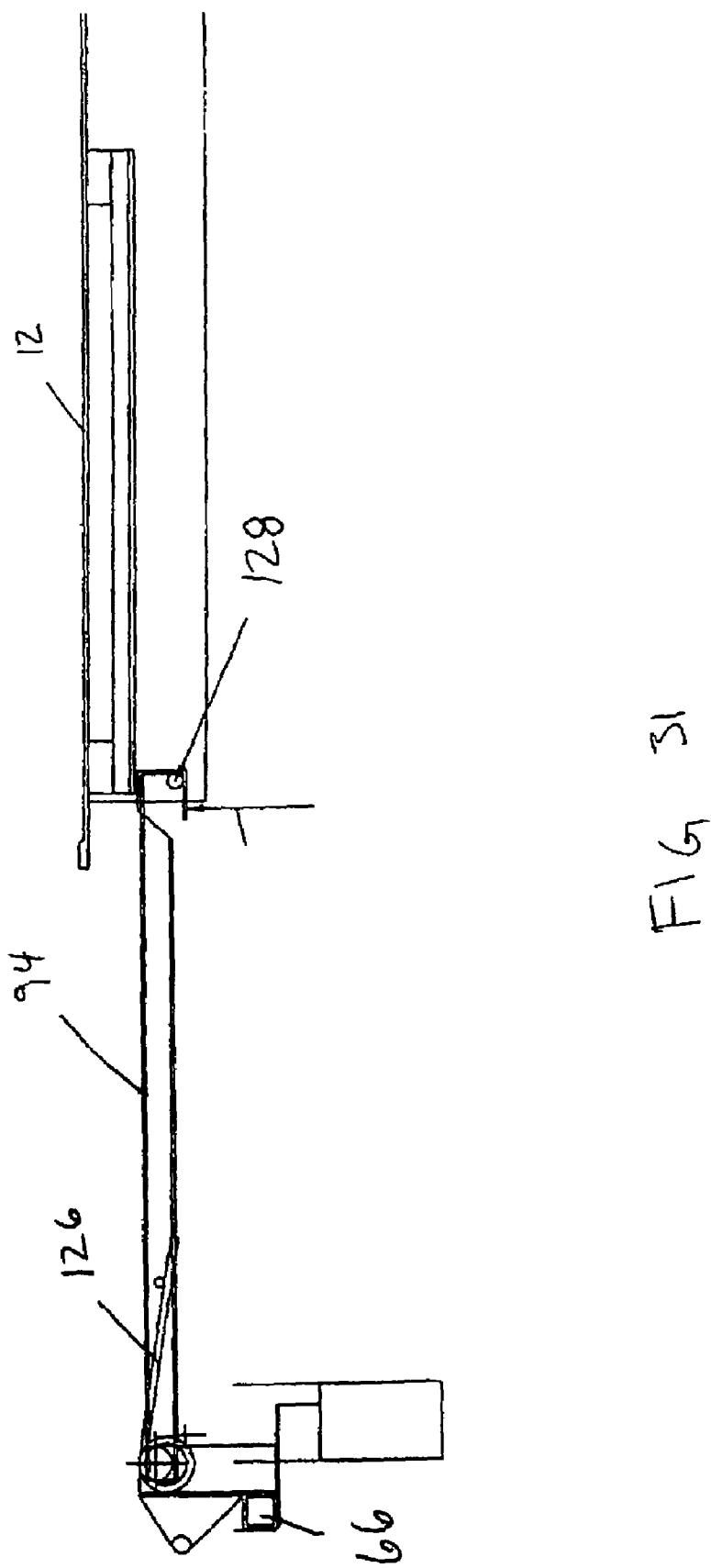
FIG. 31 is an enlarged detail of FIG. 8 of the lift arm of the convertible cap/cover assembly, showing the cap/cover assembly in first stage of the transition from the cover to the cap configuration.
Figure 32:
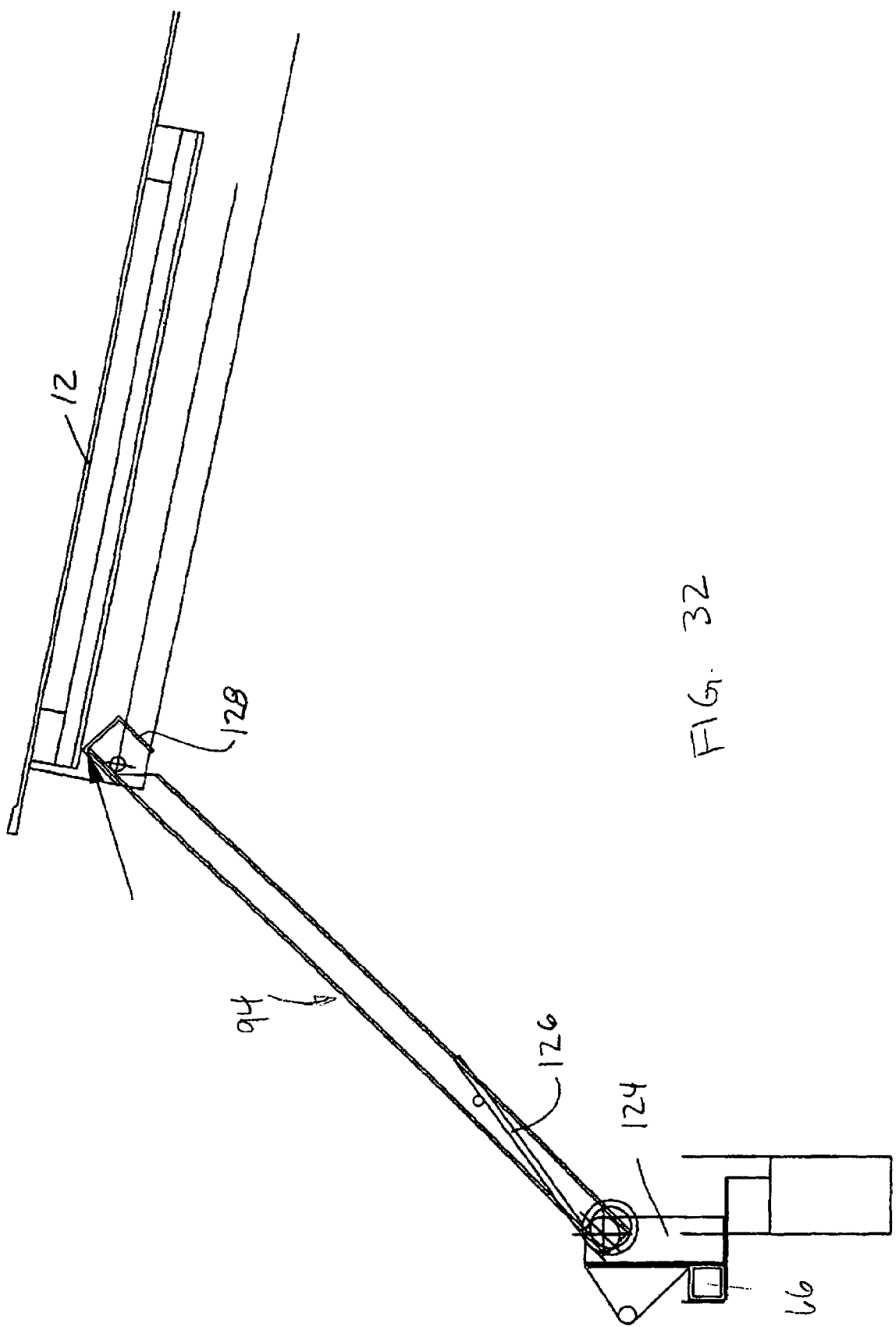
FIG. 32 is an enlarged detail of FIG. 9 of the lift arm of the convertible cap/cover assembly, showing the cap/cover assembly in second stage of the transition from the cover to the cap configuration.
Figure 33:
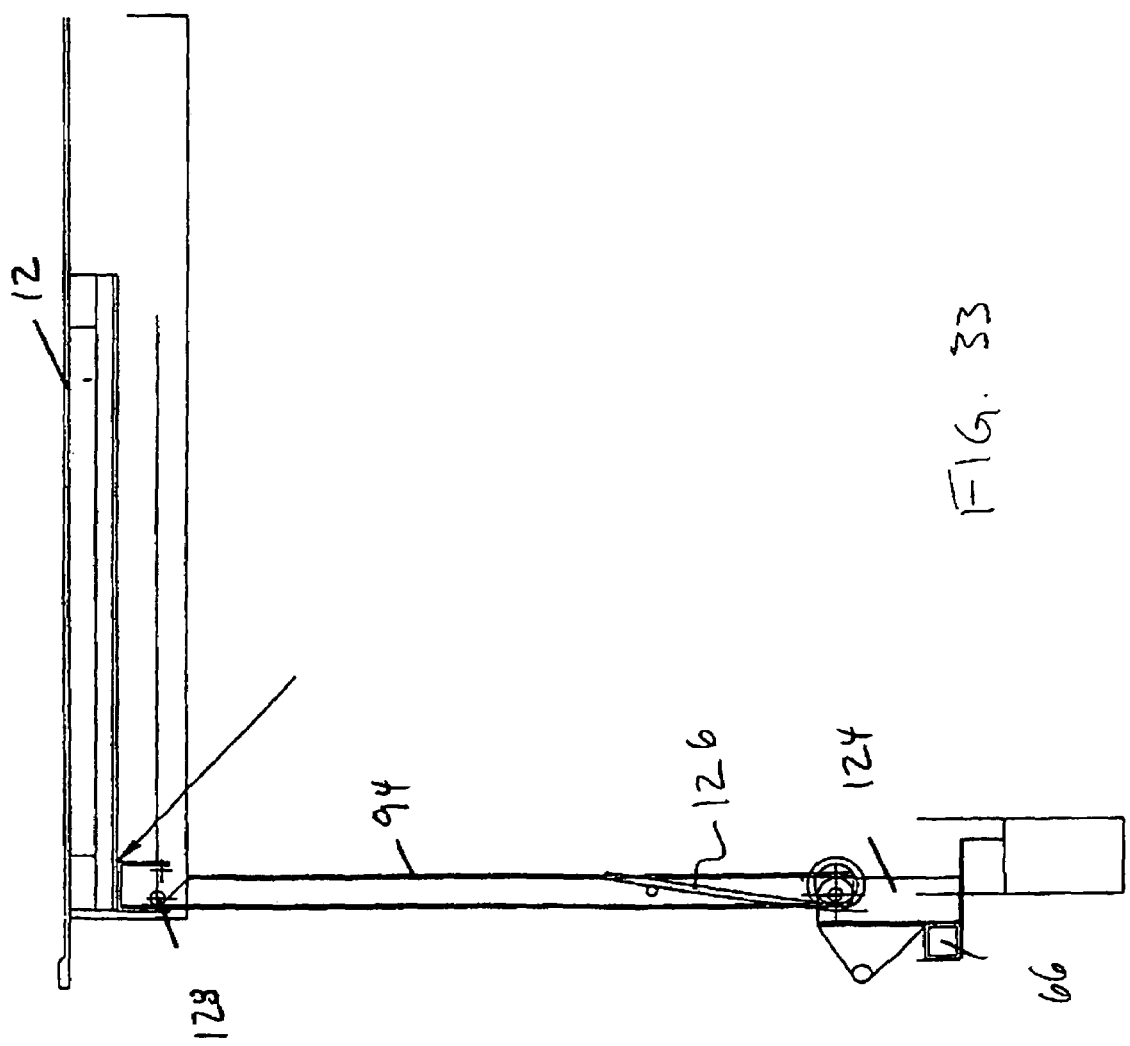
FIG. 33 is an enlarged detail of FIG. 10 of the lift arm of the convertible cap/cover assembly, showing the cap/cover assembly in the cap configuration.

Referring to FIG. 30, the lift arm 94 consists of two parallel square section tubes 118 connected by a channel section 120. The lift arm 94 pivots on a lift arm hinge 122. Lift arm hinge 122 is mounted in lift arm hinge brackets 124 on the front lateral bar 66 which is located immediately behind the front wall of the truck box 11. Torsion springs 126 are located on the lift arm hinge 122 with the load arm attached to the square tubes 118. A friction guide pad or conveyor strip 127 is provided on the underside of the top panel 12.

In the cap configuration the lift arm 94 is vertical and supports the front edge of the cap, the spring load is zero. In the cover configuration the lift arm 94 is horizontal and a latch bar 128 mounted between the top panel center rails 56 interacts with it in two ways. Specifically, when the cover is closed, the latch bar 128 is lodged under the lift arm 94 close to the hinge point, locking the front of the cover to the lift arm 94. This holds the front of the cover down but allows the rear to be lifted (pivoting about the lift arm hinge 122 for access to the truck box. In the transition from cover to cap, discussed in more detail below, when the cover is pulled rearwards the latch bar 128 slides along under the lift arm 94 until it engages in the channel section 120. This links the front of the cover to the end of the lift arm 94. At this point the torsion spring load is a maximum and is tending to lift the front of the cover. By pushing downwards and forwards the cover follows the lift arm 94 as it rotates into the vertical position.

A prop 130 is a swinging frame that is hinged to the rear ends of the top panel center rails 56, it is stored between the center rails 56 in a horizontal position. Prop 130 swings down and locates on the rear lateral bar 64 to support the rear edge of the top panel 12 during the folding and unfolding procedure prior to the transition from cap to cover configuration and vice versa. To lower the folded assembly into the cover configuration, the bottom edge of the prop 130 is pushed forwards off the lateral bar 64 and as the rear edge of the cover moves backwards and downwards the prop is once again folded into the horizontal position.

Referring to FIGS. 26 to 29 and the details of these figures found in FIGS. 30 to 37, to convert to the cap configuration, the cover assembly is raised with the aid of the lift arm 94 and supported at the rear by a retractable prop 130. The sides 14 are unfolded by releasing the cables 132 and are attached to the pick-up box sides using stake pocket locking mechanisms 40 that latch into the stake pockets 42. The three bar link support mechanism 106 is raised on both sides to create a rigid connection between the outer rail 28 of the top panel and the bottom rail portion 38 of the side panel, again creating a tension in the flexible panels 20. The rear prop 130 is retracted and front and rear covers attached.

To convert from the cap to the cover configuration, the sequence of events of are reversed. The retractable prop 130 is lowered to support the rear of the cover, the stiffening mechanisms or three bar link mechanism 106 are collapsed, the stake pocket locks 40 are released and the sides are raised. The forward end of the side panels are raised by pulling on cables 132, initially by hand and then by attaching the free ends of the cables to tensioning levers 135 which are rotated into an over-center lock position. Pulleys 133 are attached to the underside of the top panel 12 to ease the use of cables 132. The rear end of the side panels are raised by hand and latched at 137 into the cover configuration by short lanyards 134 that engages in slots in the rear ends of the side panel bottom rail portions 38. Lifting the rear edge of the cover releases the prop 130 and the cover is then lowered and pulled rearwards. The front edge of the cover is still locked to the lift arm 94 which rotates downwards as the cover moves rearwards. The torsion springs 126 wind up and act as a shock absorber to cushion the drop of the cover. Finally the cover is pushed forward, riding on conveyor strips 127, until the latch bar 128 is locked under the lift arm 94 as shown in 30.

After raising the cap and before the retractable prop 130 is removed, the three bar link 106 is raised until the connecting link 110 contacts the underside of the top panel outer rail 28 and is lodged behind retention blocks 116 attached to the outer rail 28. Further rearward movement of the rotating links 108 lifts the outer rail 28 creating a tension in the flexible panel 20. The three bar link 106 is latched back to the rear edge of the rigid side panel 22 using an over-center latch similar to SPAE-NAUR part #096-640.

The transition from cover to cap and vice versa could be motorized using high torque motors to drive the lift arm 94 and to raise and lower the sides, again depending on the degree of sophistication and cost that the market will bear.

The method of construction shown is only intended for demonstrating the novel concepts involved. The rigid top and sides will have a covering. A production version may be made from fiberglass with a honeycomb core.

The reinforcement in the flexible panel 20 may vary from the single ply fabric, as used in the prototype, to multiple plies, kevlar or steel mesh depending on the degree of security required and the cost that the market will bear.

The invention may be adapted for use as a camping trailer cover by increasing the height of the rigid side panels 22. However, the method of raising and lowering would have to be modified as the span of the lift arm 94 and prop 130 would be significantly reduced resulting in the folded assembly being unstable.

As used herein, the terms "comprises" and "comprising" are to be construed as being inclusive and opened rather than exclusive. Specifically, when used in this specification including the claims, the terms "comprises" and "composing" and variations thereof mean that the specified features, steps or components are included. The terms are not to be interpreted to exclude the presence of other features, steps or components.

It will be appreciated that the above description related to the invention by way of example only. Many variations on the invention will be obvious to those skilled in the art and such obvious variations are within the scope of the invention as described herein whether or not expressly described.

What is claimed as the invention is:

1. A cap and cover assembly for use with a pick up truck having a truck box comprising:
   a top panel;
   opposing sides, each side having a flexible side portion hingeably attached to a rigid side portion, the flexible side portion having one side being attached to the top panel and each side being releasably attached to the truck box; and
   wherein the opposing sides have a cover configuration where the sides are in a stowed portion and a cap configuration where the sides are generally upright.

2. A cap and cover assembly as claimed in claim 1 wherein the flexible side portion includes a flexible sheet attached to a longitudinal lower sheet rail and a longitudinal upper outer sheet rail.

3. A cap and cover assembly as claimed in claim 2 further including a hinge tube attached to each lower sheet rail.

4. A cap and cover assembly as claimed in claim 3 wherein the rigid side portion is generally L-shaped in cross section with an elongate side portion and a bottom rail portion and wherein the bottom rail portion is releasably attached to the truck box when the sides are in the cap configuration.

5. A cap and cover assembly as claimed in claim 4 wherein the bottom rail portion is releasably attached to the truck box with a plurality of stake pocket locks.

6. A cap and cover assembly as claimed in claim 5 wherein each stake pocket lock includes a stake pocket in the truck box and a stake cam which is engageable in the stake pocket.

7. A cap and cover assembly as claimed in claim 6 wherein the stake cam includes a lever and a plurality of stake cams along one side are ganged together.

8. A cap and cover assembly as claimed in claim 6 wherein each side includes two stake locks.

9. A cap and cover assembly as claimed in claim 6 wherein each side includes three stake locks.

10. A cap and cover assembly as claimed in claim 4 further including opposing three bar links attached to opposing sides of the bottom rail portion of the rigid side panel, the three bar links having a stowed position and a cap configuration and in the cap configuration the three bar links provide further support for the top panel.

11. A cap and cover assembly as claimed in claim 10 wherein in the cap configuration each three bar link lodges against the upper outer rail and tensions the flexible side portion and is held in place with an over center tension latch.

12. A cap and cover assembly as claimed in claim 4 wherein the top panel has a center rail that extends downwardly from the underside of the top panel, the center rail includes a center portion and a sloped side portion, the center rail is sized such that when the assembly is in the cover configuration the bottom rail portion of the rigid side portion is in a keystone arrangement and tensions the flexible side portions.

13. A cap and cover assembly as claimed in claim 1 further including a cap front panel releaseably connectable between the top panel and the truck box and a cap back panel releasably connectable between the top panel and the truck box when the sides are in the cap configuration.

14. A cap and cover assembly as claimed in claim 3 further including a cap front panel releasably connectable between the top panel and the truck box wherein the cap front panel hooks over the top panel, is releasably connected to a front end of the hinge tubes and hooks over a bar operably attached to the front of the truck box.

15. A cap and cover assembly as claimed in claim 3 further including a cap rear panel releasably connectable between the top panel and the truck box wherein the cap rear panel snaps into a groove in an underside of the top panel, is releasably connected to a rear end of the hinge tubes and hooks over a rear lateral bar operably attached to the rear of the truck box.

16. A cap and cover assembly as claimed in claim 15 wherein the cap rear panel includes a hatch hingeably attached thereto.

17. A cap and cover assembly as claimed in claim 1 further including a cover front panel releaseably connectable between the top panel and the truck box and a cover back panel releasably connectable between the top panel and the truck box when the sides are in the cover configuration.

18. A cap and cover assembly as claimed in claim 3 further including a cover front panel releasably connectable between the top panel and the truck box wherein the cover front panel hooks over the top panel, is releasably connected to a front end of the hinge tubes and hooks over a bar operably attached to the front of the truck box.

19. A cap and cover assembly as claimed in claim 3 further including a cover rear panel releasably connectable between the top panel and the truck box wherein the cover rear panel snaps into a groove in the underside of the top panel, is releasably connected to a rear end of the hinge tubes and hooks over a rear lateral bar operably attached to the rear of the truck box.

20. A cap and cover assembly as claimed in claim 1 further including a prop adapted to be positioned under a rear end of the top panel to provide access to the truck box.

21. A cap and cover assembly as claimed in claim 20 wherein the prop is further adapted to support the top panel during the process of converting the cap and cover assembly from the cover configuration to the cap configuration.

22. A cap and cover assembly for use with a pick up truck having a truck box comprising:
    a top panel;
    opposing sides, each side being hingeably attached to the top panel and releasably attachable to the truck box and wherein the opposing sides have a cover configuration where the sides are in a stowed position and a cap configuration when the sides are generally upright; and
    a spring loaded lift arm operably connected to the top panel and adapted to aid in converting the cap and cover assembly from the cover configuration to the cap configuration and wherein the lift arm is attached to a front lateral bar attached to the front of the truck box.

23. A cap and cover assembly as claimed in claim 22 wherein a latch bar is attached to the top panel and the latch bar is slideably attached to the lift arm.

24. A cap and cover assembly as claimed in claim 23 wherein the lift arm includes a torsion spring and the spring is arranged such that the spring load is zero when the top panel is in the cap configuration.

25. A cap and cover assembly as claimed in claim 24 wherein each side of the cap and cover assembly has a flexible side portion hingeably attached to a rigid side portion, the flexible side portion having one side being attached to the top panel and the other side being releasably attached to the truck box.

\* \* \* \* \*